United States Patent
Scherbring et al.

(10) Patent No.: US 8,240,423 B2
(45) Date of Patent: Aug. 14, 2012

(54) ALL-WHEEL STEERING SYSTEM AND VEHICLE INCORPORATING THE SAME

(75) Inventors: David J. Scherbring, Savage, MN (US); Jackie R. Gust, Northfield, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 13/038,072

(22) Filed: Mar. 1, 2011

(65) Prior Publication Data

US 2011/0147110 A1 Jun. 23, 2011

Related U.S. Application Data

(62) Division of application No. 12/025,125, filed on Feb. 4, 2008, now Pat. No. 7,918,305.

(60) Provisional application No. 60/899,443, filed on Feb. 5, 2007.

(51) Int. Cl.
*B62D 5/06* (2006.01)

(52) U.S. Cl. .................... 180/408; 180/414; 280/91.1

(58) Field of Classification Search .................. 180/408, 180/409–416; 280/91.1
See application file for complete search history.

(56) References Cited

U.S. PATENT DOCUMENTS

| | | |
|---|---|---|
| 2,029,540 A | 2/1936 | Porteous |
| 2,095,566 A | 10/1937 | Lundelius et al. |
| 2,453,311 A | 11/1948 | Fedevich |
| 3,198,541 A | 8/1965 | Christenson et al. |
| 3,202,238 A | 8/1965 | Strader |
| 3,261,421 A | 7/1966 | Forster et al. |
| 3,351,147 A | 11/1967 | Williamson |
| 3,596,730 A | 8/1971 | Cecce |
| 3,768,585 A | 10/1973 | Matteo |
| 4,175,638 A | 11/1979 | Christensen |
| 4,296,826 A | 10/1981 | van der Lely |
| 4,402,181 A | 9/1983 | Acker et al. |
| 4,671,376 A | 6/1987 | Ito et al. |
| 4,721,318 A | 1/1988 | Hase et al. |
| 4,738,459 A | 4/1988 | Nakamura et al. |
| 4,798,393 A * | 1/1989 | Miura et al. .................. 180/409 |
| 4,805,719 A | 2/1989 | Kostamo |
| 4,878,556 A | 11/1989 | Wells |
| 4,957,183 A | 9/1990 | Mullett et al. |
| 4,977,733 A | 12/1990 | Samejima et al. |
| 5,048,853 A | 9/1991 | Trefz et al. |
| 5,090,512 A | 2/1992 | Mullet et al. |
| 5,174,595 A | 12/1992 | Snipes |
| 5,259,475 A | 11/1993 | Butler |
| 5,288,091 A | 2/1994 | Deschamps |

(Continued)

OTHER PUBLICATIONS

"T-Series Pumps". Hydro-Gear® Pumps and Motors, Sullivan, IL, © 2004; 8 pgs.

(Continued)

*Primary Examiner* — Kevin Hurley
(74) *Attorney, Agent, or Firm* — Mueting, Raasch & Gebhardt, P.A.

(57) ABSTRACT

An all-wheel steering system and vehicle, e.g., riding lawn mower, incorporating the same. The system may include a linkage system that operatively connects the vehicle wheels for simultaneous turning. The system, in one embodiment, includes a power steering unit having fixed or variable output for a given steering input. The system may further include a mechanism for reducing speed based upon mower steering angle.

20 Claims, 14 Drawing Sheets

U.S. PATENT DOCUMENTS

| | | | |
|---|---|---|---|
| 5,355,665 A | 10/1994 | Peter | |
| 5,531,466 A | 7/1996 | Hayashi | |
| 5,667,032 A | 9/1997 | Kamlukin | |
| 5,823,284 A | 10/1998 | Hoar et al. | |
| 5,890,558 A | 4/1999 | Keegan | |
| 5,946,894 A | 9/1999 | Eavenson et al. | |
| 6,012,274 A | 1/2000 | Eavenson et al. | |
| 6,131,689 A | 10/2000 | Nodorft et al. | |
| 6,481,524 B1 | 11/2002 | Ishida et al. | |
| 6,625,966 B2 | 9/2003 | Kaneyuki et al. | |
| 6,684,974 B1 | 2/2004 | Ulschmid | |
| 7,347,434 B2 * | 3/2008 | Lewis et al. | 280/99 |
| 7,571,916 B2 | 8/2009 | Skiles | |
| 7,918,305 B2 | 4/2011 | Scherbring et al. | |
| 7,922,184 B2 * | 4/2011 | Porcheron | 280/93.506 |

OTHER PUBLICATIONS

"OSPM Mini-Steering Unit, OTPM Steering Column" Technical Information. Sauer Danfoss, Ames, IA, © 2001; 20 pgs.

* cited by examiner

ALL-WHEEL STEERING SYSTEM AND VEHICLE INCORPORATING THE SAME

RELATED APPLICATIONS

This application is a divisional of U.S. application Ser. No. 12/025,125, filed Feb. 4, 2008, which claims the benefit of U.S. Provisional Appl. No. 60/899,443, filed Feb. 5, 2007, both of which are incorporated herein by reference in their respective entireties.

TECHNICAL FIELD

The present invention relates generally to ground traversing vehicles and, more particularly, to vehicles such as riding lawn mowers incorporating all-wheel, e.g., 4 wheel, steering.

BACKGROUND

Traditional riding mowers, e.g., those typically having four wheels wherein the front wheels are conventionally steerable, are in common use by homeowners and professionals alike. However, for lawns having numerous obstacles, tight spaces, and/or intricate borders, riding mowers having zero-radius-turning (ZRT) capability are often preferred. As the name implies, "ZRT" generally indicates a vehicle having a very tight minimum turning radius, i.e., a vehicle that is highly maneuverable.

ZRT riding mowers, like other ZRT vehicles, typically include a frame and at least one drive wheel located on each side (left and right) of the frame. The drive wheels may be independently powered by a vehicle engine (e.g., via a hydraulic motor) so that, while one wheel may rotate in a first direction at a first speed, the other wheel may rotate in the same or different direction at the same or different speed. Rotating one drive wheel for forward motion while simultaneously slowing, stopping, or rotating the other drive wheel for rearward motion, may cause the mower to turn generally about a turning center located between the drive wheels, thus executing a sharp turn. Typically, the mower includes one or more other wheels, e.g., front caster wheels, in addition to the drive wheels to support the remaining weight of the mower.

While configurations vary, the drive wheels are often controlled by a twin lever control system. In this configuration, two motion control levers are typically provided and positioned side-by-side in front of the operator. Each control lever may be operatively connected to (and thus independently control) a particular drive wheel (e.g., the left lever may control the speed and direction of the left drive wheel, while the right lever may provide the same control for the right drive wheel). When the control levers are advanced forwardly in unison from a neutral position, the drive wheels may cause the mower to move forwardly in a straight line. Similarly, when the control levers are retracted in unison from the neutral position, the drive wheels may cause the mower to move in the reverse direction. Steering may be accomplished by differential movement of the control levers.

While effective for their intended use, ZRT mowers may, under certain conditions, present disadvantages. For instance, ZRT mowers may potentially damage turf in the event of wheel slip resulting from a temporary loss of traction. Moreover, while desirable in many applications, the turning center of a conventional ZRT is generally limited to being located along an axis of its drive wheels. What is needed is a highly maneuverable lawn vehicle that overcomes these and other limitations.

SUMMARY

The present invention may overcome these and other issues by providing, in one embodiment, a vehicle having a frame. The vehicle also includes a left front wheel assembly and a right front wheel assembly, wherein each of the left front wheel assembly and right front wheel assembly has: a front support arm pivotally coupled to the frame; and a ground-engaging front wheel rotatably coupled to the front support arm. The vehicle may further include a left rear wheel assembly and a right rear wheel assembly, wherein each of the left rear wheel assembly and right rear wheel assembly includes: a rear support arm pivotally coupled to the frame; and a ground-engaging rear wheel rotatably coupled to the rear support arm. A front linkage assembly may also be provided connecting the left front wheel assembly to the right front wheel assembly. Also included is a left wheel tie rod having: a forward end coupled to the front support arm of the left front wheel assembly; and an aft end coupled to the rear support arm of the left rear wheel assembly. A right wheel tie rod is further included and has: a forward end coupled to the front support arm of the right front wheel assembly; and an aft end coupled to the rear support arm of the right rear wheel assembly. A steering actuator attached to the frame and to the front linkage assembly is also provided, the actuator responsive to manipulation of a steering input device.

In another embodiment, a mower vehicle is provided and includes a frame. A left front wheel assembly and a transversely offset right front wheel assembly are also provided and are both located at or near a forward end of the frame, wherein each of the left and right front wheel assemblies includes: a front support arm pivotally coupled to the frame; and a steerable ground-engaging front wheel rotatably coupled to the front support arm. A left rear wheel assembly and a transversely offset right rear wheel assembly are also included and are both located at or near a rearward end of the frame, wherein each of the left and right rear wheel assemblies has: a rear support arm pivotally coupled to the frame; and a steerable ground-engaging rear wheel rotatably coupled to the rear support arm. The vehicle also includes a cutting deck attached to the frame and located generally between the front wheel assemblies and the rear wheel assemblies. In this embodiment, a steering linkage assembly is also provided and includes a rear bell crank pivotally coupled to the frame. The linkage assembly also provides a left rear tie rod including a proximal end pivotally coupled to the rear bell crank, and a distal end pivotally coupled to the left rear wheel assembly, and a right rear tie rod having a proximal end pivotally coupled to the rear bell crank, and a distal end pivotally coupled to the right rear wheel assembly. The linkage assembly also includes a front steering lever arm pivotally attached to the frame. A left front tie rod having a proximal end pivotally coupled to the front steering lever arm and a distal end pivotally coupled to the left front wheel assembly, and a right front tie rod having a proximal end pivotally coupled to the front steering lever arm and a distal end pivotally coupled to the right front wheel assembly are also included. An included longitudinal tie rod has an aft end pivotally attached to the rear bell crank and a forward end pivotally attached to the front steering lever arm. A steering input device coupled to the frame to control vehicle direction is also provided, as is a steering actuator attached to the frame and to the steering linkage assembly, the steering actuator responsive to manipulation of the steering input device.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIGS. 6A and 6B illustrate exemplary schematics of hydraulic circuits or systems that may be used with the riding lawn mower of FIG. 1 (or that of FIG. 7), wherein; FIG. 6A provides an exemplary circuit for a constant steering rate; and FIG. 6B provides an exemplary circuit for a variable steering rate;

Figure 1:
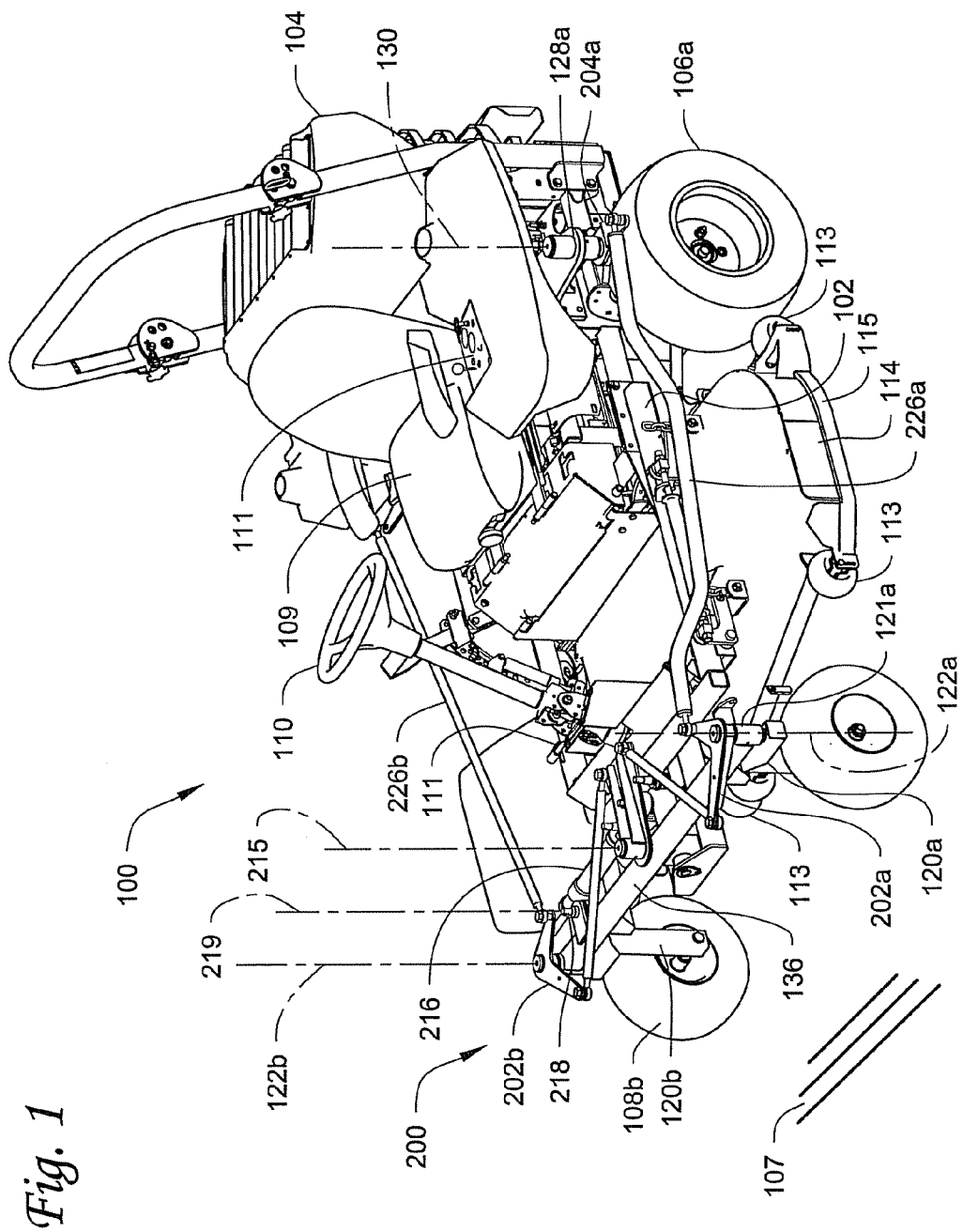
FIG. 1 is a perspective view of a vehicle, e.g., a riding lawn mower, incorporating an all wheel steering (AWS) system in accordance with one embodiment of the invention.

The figures are rendered primarily for clarity and, as a result, are not necessarily drawn to scale. Moreover, certain structure (e.g., chassis components, cutting deck, fasteners, hydraulic hoses and fittings, etc.) may be removed from some of the figures where such removal is beneficial to describing the particular embodiments of the invention. The removal of such structure, however, is not to be interpreted as limiting the scope of the invention in any way.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

It is noted that the terms "comprises" and variations thereof do not have a limiting meaning where these terms appear in the accompanying description and claims. Further, "a," "an," "the," "at least one," and "one or more" may be used interchangeably in this description.

Relative terms such as left, right, forward, rearward, top, bottom, side, upper, lower, above, below, horizontal, vertical, and the like may be used herein and, if so, are from the perspective observed in the particular figure, or as observed when the vehicle or system is in its typical operating position (see, e.g., FIGS. 1 and 7). These terms are used only to simplify the description, however, and not to limit the scope of the invention in any way.

The reference numeral suffixes "a" and "b" may be used throughout this description to denote left and right side versions, respectively, of otherwise substantially similar parts or part features. Unless otherwise noted, the description of an individual part/feature (e.g., the description of a part/feature identified with an "a" suffix) may also apply to the corresponding part/feature (e.g., the part/feature identified with a "b" suffix). Similarly, unless otherwise noted, the description of a part/feature identified with no suffix may apply to both the part/feature identified with the "a" suffix and the "b" suffix.

Embodiments of the present invention are directed to AWS systems and to ground traversing vehicles incorporating the same. In some embodiments of the invention, the vehicle may be configured as a rear engine, riding lawn mower having four ground-engaging wheels and a mid-mount cutting deck as shown in FIG. 1. While described herein primarily with respect to a rear engine, four wheeled riding lawn mower, this configuration is not limiting. For instance, AWS systems in accordance with embodiments of the present invention may find application to mowers having most any number of wheels, e.g., tricycle type lawn mowers, and mowers with most any engine configuration.

With reference to the drawings, wherein like reference numerals designate like parts and assemblies throughout the several views, FIG. 1 illustrates an exemplary AWS system, e.g. a four-wheel steering (4WS) system 200, as it may be incorporated on an exemplary vehicle, e.g., a rear engine, rear drive riding lawn mower 100. While described with respect to a particular riding lawn mower (hereinafter generically referred to as a "mower"), those of skill in the art will realize that the invention is equally applicable to most any type of powered ground-working vehicle (e.g., agricultural and consumer oriented mowers and other mowing and non-mowing vehicles).

FIG. 1 illustrates the exemplary mower 100 having a chassis or frame 102 that supports a prime mover (e.g., internal combustion engine 104 or, alternatively, an electric power source). A pair of transversely opposing, rear ground-engaging drive wheels 106 (only left rear wheel 106a visible in FIG. 1) may support the mower 100 in rolling engagement with a ground surface 107. Similarly, at least one front wheel 108 may support a forward portion of the mower 100. In the illustrated embodiment, the mower 100 includes two front ground engaging wheels 108 (e.g., wheels 108a and 108b) as shown.

Figure 2:
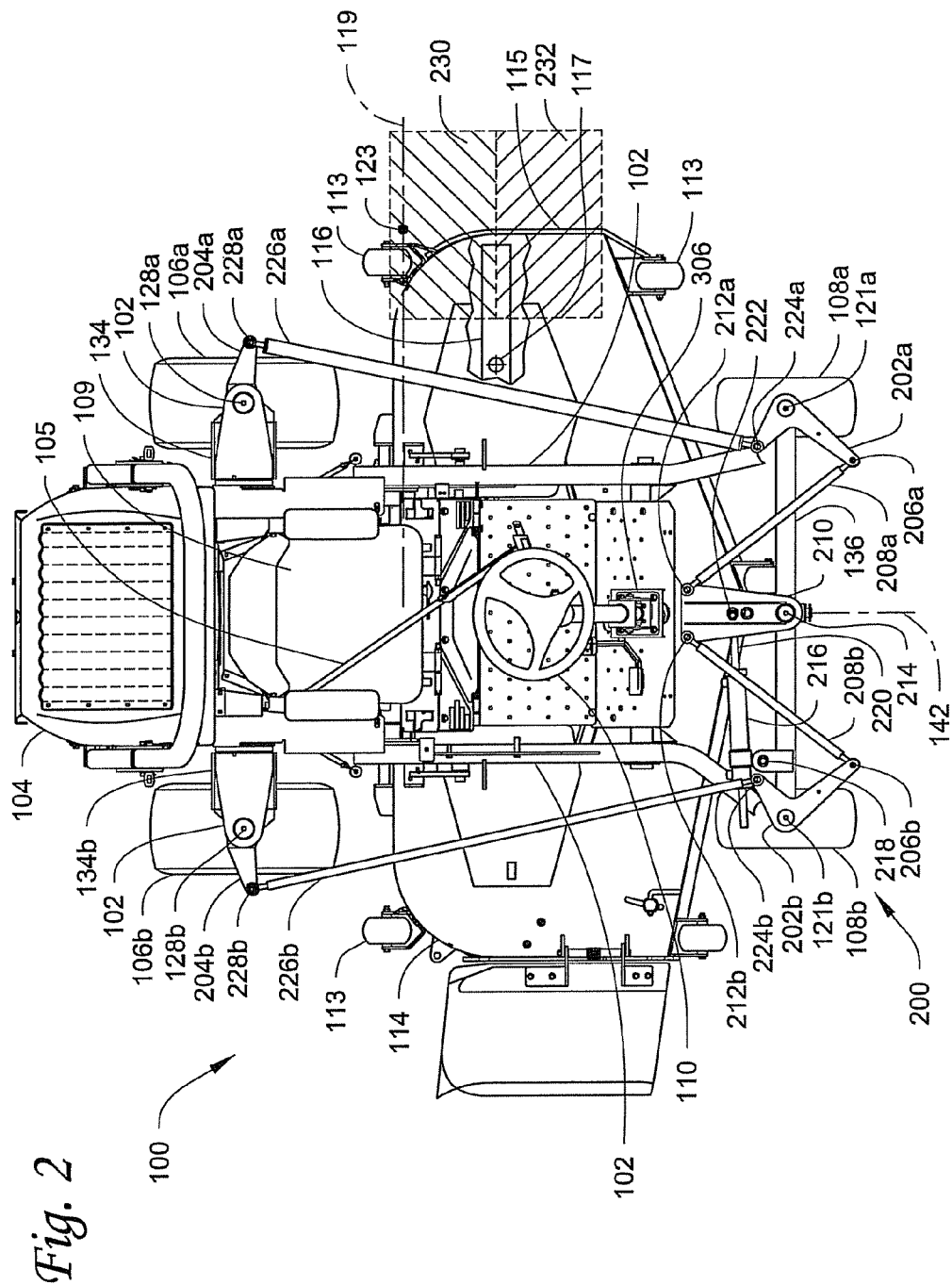
FIG. 2 is a top plan view of the riding lawn mower of FIG. 1.

Each drive wheel 106 may be powered by separate hydraulic motors 134 (see FIGS. 2 and 3) attached directly to an axle of the respective drive wheel. Each of the hydraulic motors may receive power from a hydraulic (e.g., hydrostatic) pump 304 (see FIG. 6A) under control of an operator located at an operator station, e.g., standing platform (not shown) or seat 109 (optionally including a seat belt 105 as shown in FIG. 2). The hydraulic pomp 304, in turn, may be powered by the engine 104. Other wheel drive systems (e.g., mechanical systems, electrical motors, and/or vehicles having a single hydraulic motor driving both wheels) could also be used without departing from the scope of the invention. Similarly, vehicles having front wheel or all wheel drive are also possible.

As used herein, "wheels" may refer to a combination wheel and tire. Those of skill in the art will realize that such a tire component could, for example, be pneumatic or semi-pneumatic.

An implement, e.g., a cutting deck 114 may be mounted, in one embodiment, to the lower side of the frame 102 generally between the rear drive wheels 106 and the front wheels 108 (sometimes referred to as a mid-mount configuration). The cutting deck 114 may include one or more cutting blades 116 (see FIG. 2) that are operatively powered by the engine 104. The cutting deck 114 may define a trim edge 115 (e.g., the periphery of the cutting path that the operator may use to follow lawn borders) located along outer edge of the cutting deck. Miscellaneous controls 111 permit the operator to control various mower functions, e.g., throttle, blade engagement, etc. A steering input device, e.g., steering wheel 110, may further permit the operator to control the direction of the mower as further described below. Other steering input devices, e.g., joysticks, levers, handlebars, fingertip controls, etc., are also possible.

During operation, power is selectively delivered to the cutting deck 114 and the drive wheels 106, whereby the cutting blades 116 rotate at a speed sufficient to sever grass and other vegetation as the cutting deck passes over the ground surface 107. Typically, the cutting deck 114 has an operator-selectable height-of-cut control to allow adjustment of the cutting deck height relative to the ground surface 107. The cutting deck 114 may optionally include deck rollers 113 to assist in supporting the cutting deck relative to the ground surface 107 during operation.

The mower 100 may include left and right front wheel assemblies that include, among other components, the respective front wheel and a front support arm, e.g., inverted L-shaped support arm 120. In the illustrated embodiments, each of the front wheels 108 may be rotatably mounted to an axle that is itself attached to the front support arm 120. Each front support arm 120 may be pivotally coupled to a front frame pivot joint 121 located at opposite ends of a transverse front frame rail 136 such that each support arm may pivot about a generally vertical pivot axis 122. Each pivot axis 122 may, in one embodiment, pass generally through a centerline of the respective wheel 108. It is understood that the various pivot joints (e.g., pivot joint 121) identified herein incorporate bearing systems adequate to withstand normal operating loads.

As further described below, each front support arm 120 may also include a front bell crank 202 that may also pivot about its respective pivot axis 122. In the illustrated embodiment, each bell crank 202 may form a separate component that operatively couples to its respective front support arm 120 so that the components move in unison, e.g., rotation of the bell crank 202a may result in corresponding rotation of the arm 120a and wheel 108a. To permit attachment, each arm 120 may include a splined shaft that extends upwardly through the frame pivot joint 121, such that corresponding female splines of the bell crank may engage the splined shaft. Once again, while described herein as using separate components, the front bell crank 202 could be an integral part of the front support arm 120.

Figure 3:
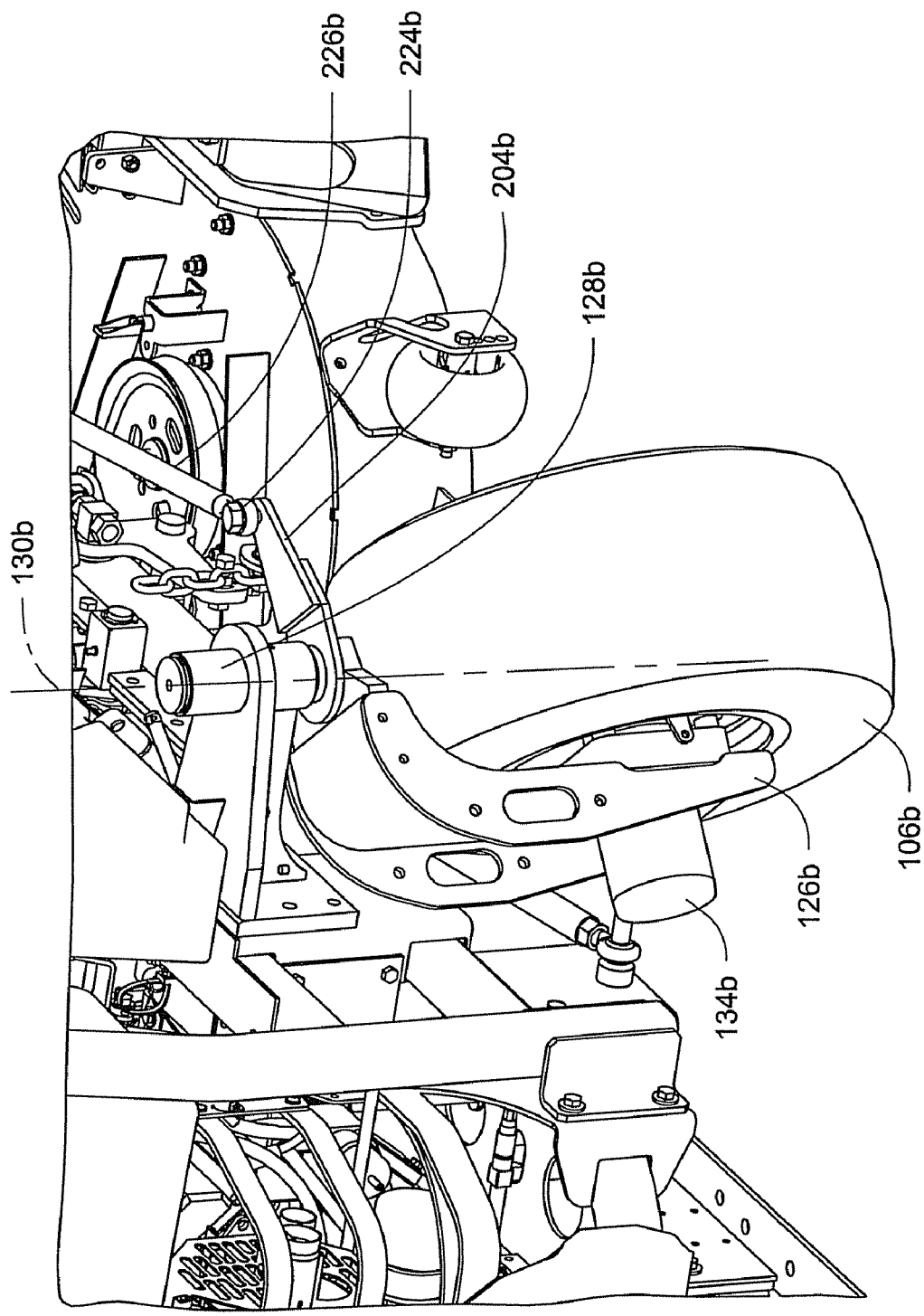
FIG. 3 is a perspective view of a right rear portion of the lawn mower of FIG. 1.

Similar to the front wheels 108, each rear wheel 106 may form part of a rear wheel assembly (e.g., left and right rear wheel assemblies) that also includes a rear support arm, e.g., an inverted L-shaped support arm 126 (see, e.g., FIG. 3). In the illustrated embodiments, each rear wheel is attached to an axle that is rotatably mounted to the rear support arm 126. Each rear support arm 126 may be pivotally coupled to a rear portion (e.g., rear frame pivot 128) of the frame 102 for pivoting about generally vertical pivot axes 130. Each pivot axis 130 may, in one embodiment, pass generally through a centerline of its respective wheel 106 as indicated in FIGS. 1 and 3. Each rear support arm 126 may integrally include, or otherwise be attached to, a rear lever arm 204 (see also FIG. 2) for connection of the wheel to the 4WS system as further described below.

Figure 6A:
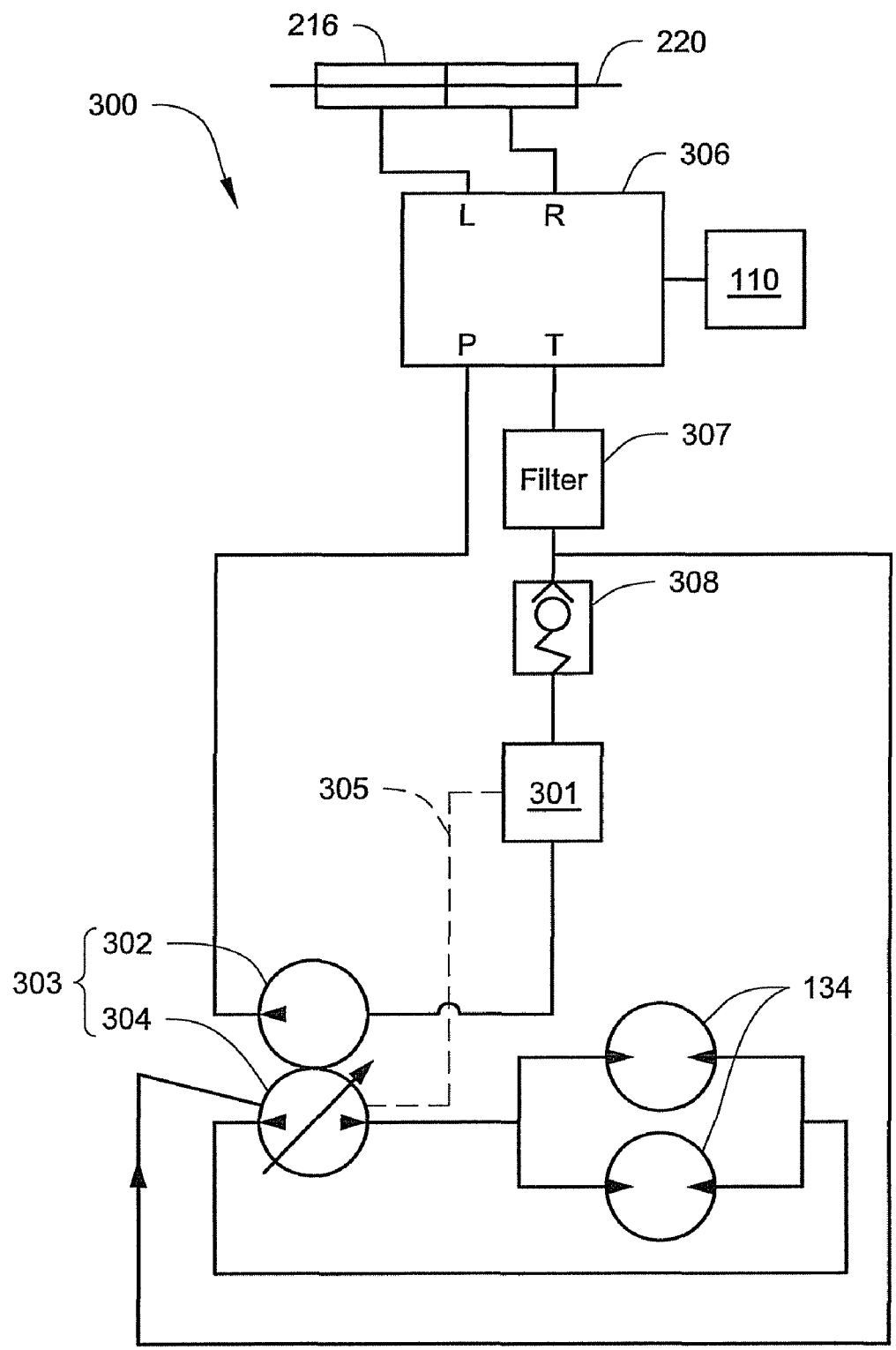

Each of the rear wheels 106 may include an axle attached to the hydraulic motor 134 (see FIG. 3) such that the axle and, accordingly, the attached rear wheel, may be rotated. In one embodiment, the two hydraulic motors (one for each rear drive wheel 106) may be hydraulically connected in parallel (as shown in FIG. 6A) to provide the hydraulic equivalent of a mechanical differential.

Other aspects/features of the mower 100 that are not central to an understanding of the illustrated embodiments of the invention, or are readily known to those skilled in the art, may also be provided. However, such other aspects/features are not necessary to an understanding of the present invention and, as a result, are not further discussed and/or illustrated herein.

FIG. 2 is a top plan view of the mower 100 of FIG. 1. With reference primarily to this view and FIG. 1, the 4WS system 200, configured in accordance with one embodiment of the invention, will be described. Each bell crank 202 (e.g., bell cranks 202a and 202b) may include a front tie rod pivot joint 206 for pivotally coupling the bell crank to second ends of front tie rods 208 (e.g., left and right front tie rods 208a and 208b). First ends of front tie rods 208 may pivotally couple to a steering lever arm 210 at steering lever arm pivot joints 212. Thus, the steering lever arm 210 and front tie rods 208 may form a front linkage assembly that connects the left front wheel assembly to the right front wheel assembly. The steering lever arm 210 may pivot about a frame pivot joint 214 (pivot about a pivot axis 215 as shown in FIG. 1) under manipulation, e.g., extension and retraction, of a steering actuator (e.g., linear hydraulic cylinder 216) that is attached to the frame and to the front linkage assembly. The cylinder 216 may pivotally attach to the front frame rail 136 at pivot joint 218 (pivot about a pivot axis 219 as shown in FIG. 1), while a rod 220 of the cylinder may attach to the steering lever arm 210 at pivot joint 222.

Each bell crank 202 may further include a rear tie rod pivot joint 224 for pivotally coupling the bell cranks to first or forward ends of longitudinal tie rods 226 (e.g., left wheel tie rod 226a and right wheel tie rod 226b). Second or aft ends of the tie rods 226 may pivotally couple to the rear lever arms 204 at pivot joints 228.

Many of the pivot joints described and illustrated herein (e.g., joints 206, 212, 222, 218, 224, and 228) may utilize spherical rod end connections to permit out-of-plane movement without excessive bending of the respective components. However, this is not limiting as other types of connections, including other pivot configurations, may be used without departing from the scope of the invention.

The longitudinal wheel tie rods 226 may be configured in any number of ways. For example, the tie rods 226 may be generally straight as depicted in FIG. 2. Alternatively, the tie rod on one or both sides, e.g., the tie rod 226a, may include one or more optional bends or jogs (as shown in FIG. 1), for example, where such a configuration is beneficial for operator ingress/egress. In case of the latter, the bent tie rod 226a may be of a larger diameter than the straight tie rod 226b to compensate for its bent shape.

The front linkage assembly (i.e., the steering lever arm and front tie rods), longitudinal wheel tie rods 226, and associated components may be described collectively herein as a steering linkage assembly.

FIG. 3 illustrates the right rear wheel 106b in a slightly turned, e.g., right turn, position. The hydraulic motor 134b and support arm 126b are also illustrated, as is the tie rod 226b, lever arm 204b, rear frame pivot 128b, and pivot joint 224b.

Figure 4:
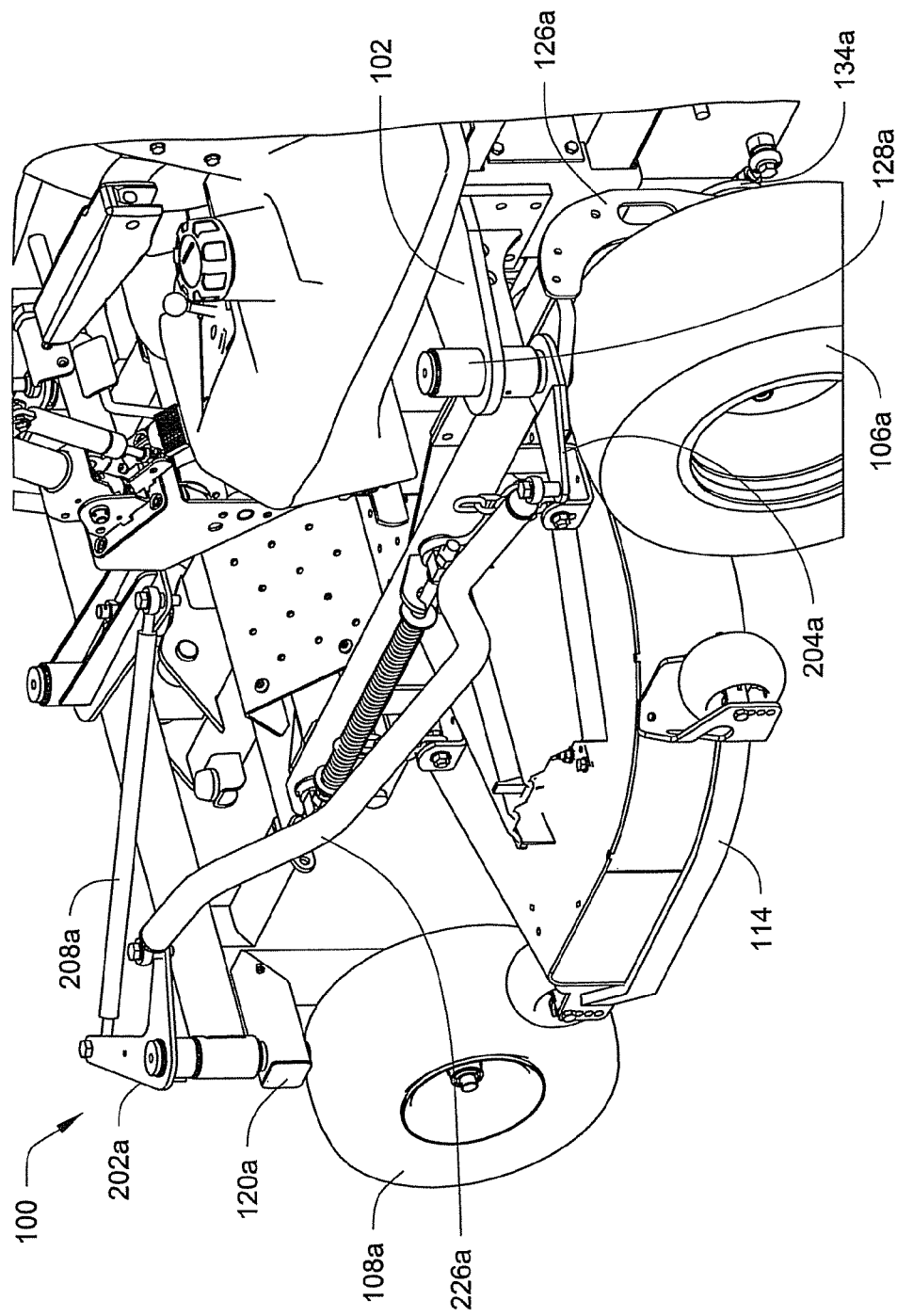
FIG. 4 is a rear perspective view of a left side portion of the lawn mower of FIG. 1.

FIG. 4 is a rear perspective view the mower 100 illustrating the longitudinal tie rod 226a and the front wheel 108a and rear wheel 106a in a generally straight, forward orientation. FIG. 4 further illustrates portions of the rear of the mower, including, for example, the hydraulic motor 134a, the rear support arm 126a, and the rear frame pivot 128a.

Figure 5:
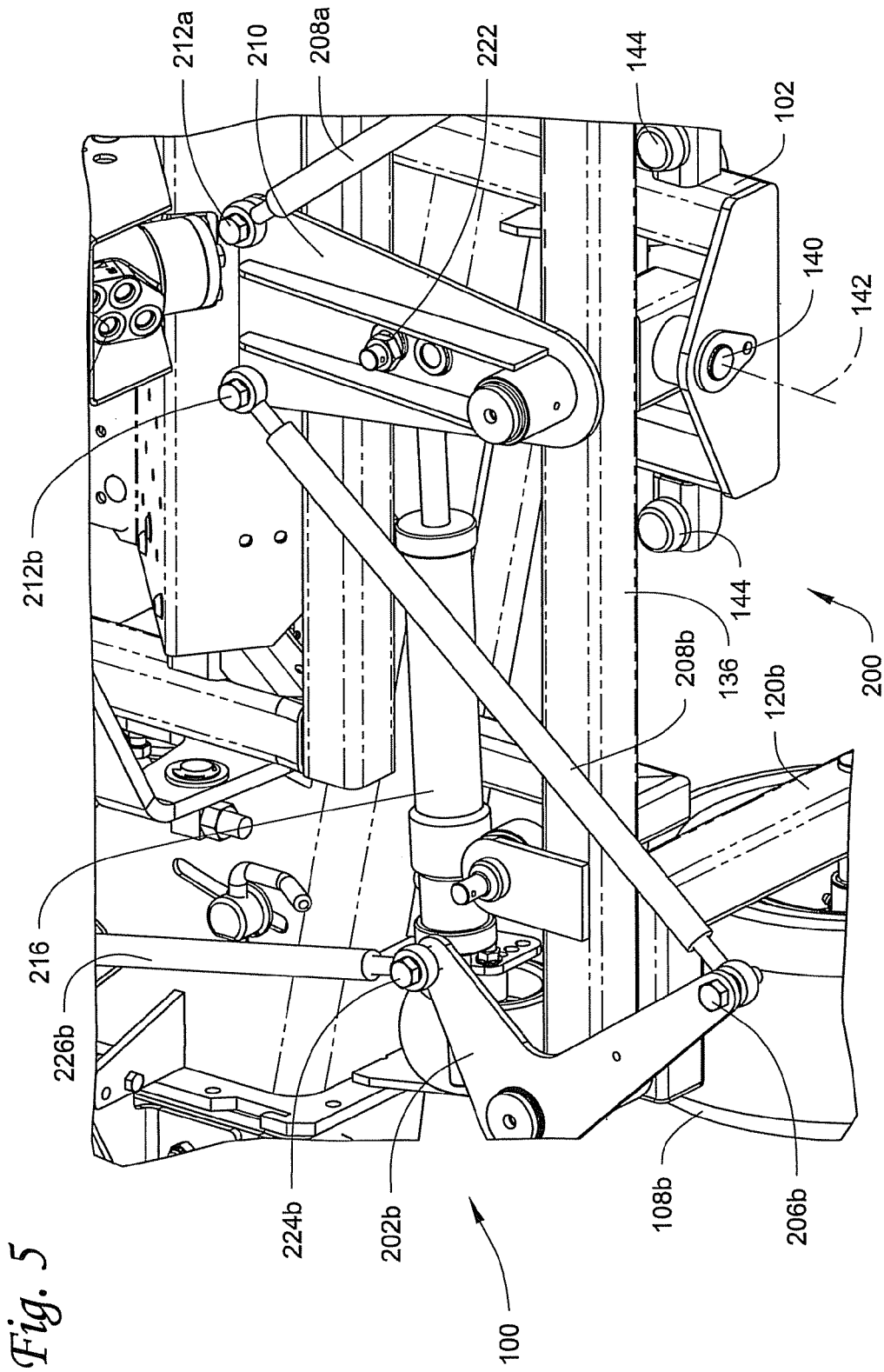
FIG. 5 is a perspective view of a front portion of the lawn mower of FIG. 1.

FIG. 5 illustrates an enlarged perspective view of a front portion of the mower 100. In this view the front frame rail 136, bell crank 202b, front tie rods 208, and steering lever arm 210 are illustrated with the 4WS system 200 in a generally straight, forward position. While not illustrated herein, the front frame rail 136 could incorporate stop members (not shown) to limit the pivotal motion of the steering lever arm 210 and prevent over-travel of the steering system.

In the embodiment of the mower illustrated in FIG. 5, the front frame rail 136 may be pivotally attached to the frame 102 at a pivot joint 140. The pivot joint 140 may allow the front frame rail 136, and thus the front wheels 108, to pivot about a generally horizontal and longitudinal pivot axis 142 as the mower 100 traverses ground undulations. The frame 102 may include stop members, e.g., rubber pads 144, to limit the extent of pivotal motion of the front frame rail 136 relative to the frame 102. As described in more detail below, the pivoting front frame rail 136 may include features that permit attachment of the transverse outer ends of the frame rail to proximal portions of the cutting deck. Such a configuration may assist in preventing scalping of turf by the cutting deck 114 as the mower traverses ground undulations.

Figure 6B:
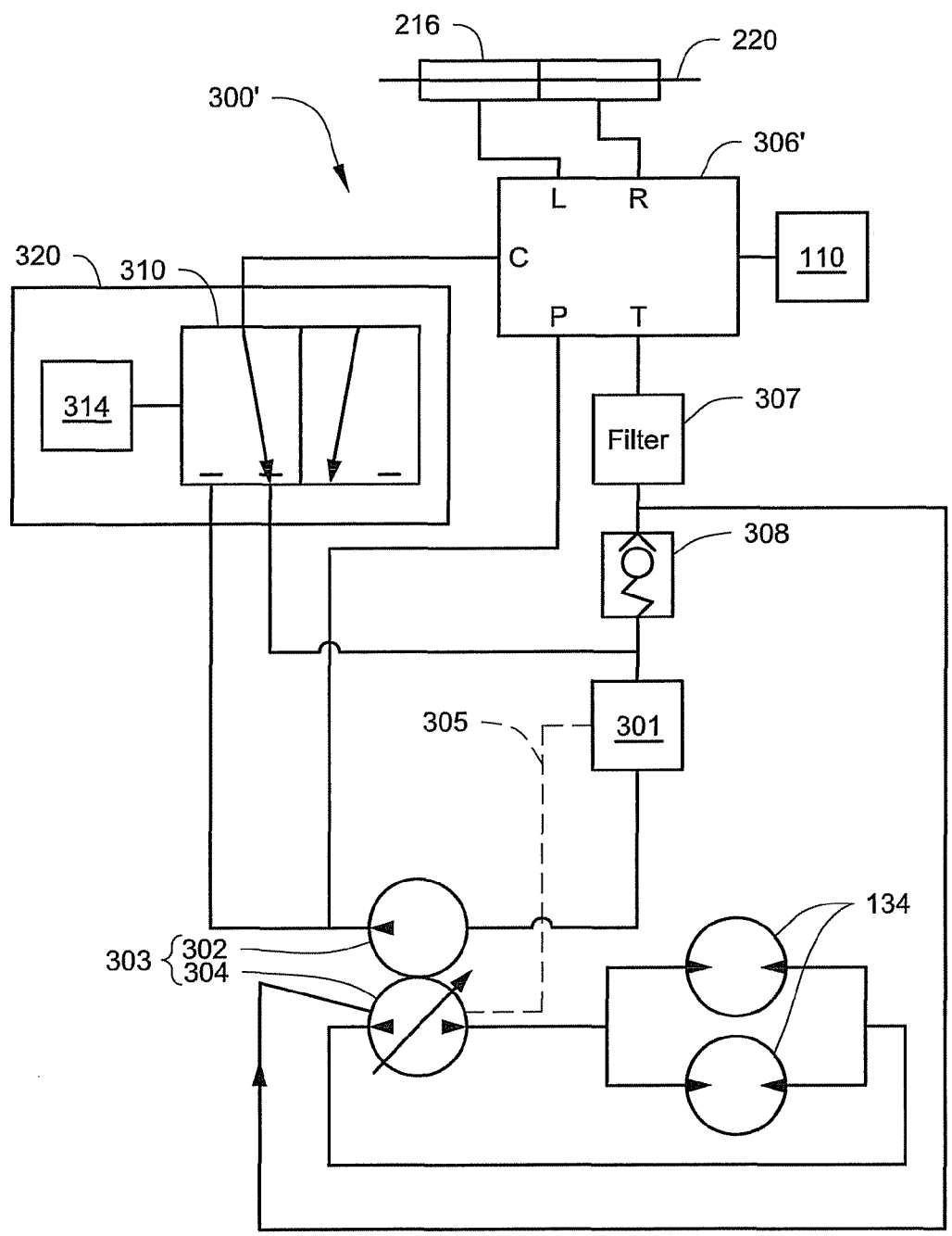

FIGS. 6A and 6B illustrate exemplary hydraulic circuits or systems 300 and 300', respectively, which may be utilized with the mower 100 and 4WS system 200 (as well as with mower 400 and system 500 described below). With reference first to FIG. 6A, the system 300 may include a hydraulic reservoir 301 that feeds a unidirectional gear pump 302. The gear pump 302 may be powered by a belt (not shown) from the engine 104 (see FIG. 1) attached to an input shaft (also not shown) of the gear pump. A hydrostatic bidirectional pump 304 may be provided and attached to the same shaft. While not wishing to be bound to any particular configuration, the gear pump 302 and hydrostatic pump 304 may, in one embodiment, be a single pump assembly 303 produced by Hydro-Gear of Sullivan, Ill., USA under part number TH-2CCH-XXXX-BEGX. The assembly 303 may also include a port for a case drain 305.

The output of the gear pump 302 may feed a power steering unit 306 (e.g., via an inlet pressure or "P" port) that, under input from the steering input device, e.g., the steering wheel 110 (see FIG. 1), directs flow to outlet ports "L" ("left") and "R" ("right") to extend or retract the cylinder 216 (e.g., extend or retract the rod 220 of the cylinder) for a left or right turn, respectively. In one embodiment, the cylinder 216 is double-ended to, for example, maintain symmetric cylinder response. Return flow from the cylinder is routed back to the reservoir through port "T." Positioned along the return line is a filter 307 and a relief valve 308 (which may be configured as a check valve) having a preset cracking pressure (e.g., a cracking pressure of more than about 50 psi, e.g., about 60 psi). The upstream side of the check valve may be tied to a charge pump inlet of the hydrostatic pump 304 as shown. The cracking pressure of the valve 308 may ensure that a minimal pressure is applied to the charge pump inlet. Based upon operator speed input, the hydrostatic pump 304 directs flow to the two wheel motors 134, which are plumbed in parallel to provide a hydrostatic differential. As a result, both wheel motors 134, as well as the position of the steering cylinder 216, may be varied based upon operator inputs. Once again, while shown as using a single hydrostatic pump 304, other configurations could utilize dual pumps (one powering each wheel motor) without departing from the scope of the invention.

While again not wishing to be bound to any particular configuration, one embodiment of the mower 100 may utilize a power steering unit 306 manufactured by Sauer-Danfoss Co. of Lincolnshire, Ill. USA, under either part numbers OSPM80 or OSPM100. This is not limiting, however, as other steering units, as well as other steering mechanisms including mechanical and electrical systems, are certainly possible.

FIG. 6B illustrates a hydraulic system 300' in accordance with another embodiment of the invention that may be used in place of the system 300. The system 300' is similar in many respects to the system 300 and, therefore, FIG. 6B contains reference numerals common to FIG. 6A to identify substantially similar components. However, unlike the system 300, the system 300' may include a steering-ratio control system 320 to selectively configure a power steering unit 306' in either a first configuration or a second configuration. The configuration may, in one embodiment, be controlled by selectively providing pressure to a port "C" of the power steering unit. In one embodiment, the exemplary power steering unit 306' is a Sauer-Danfoss Co. model number OSPD60/120. In the first configuration, hydraulic pressure is provided to the "C" port. As a result, a secondary steering rotor (not shown) may be engaged within the power steering unit 306'. In one embodiment, a primary rotor is capable of displacing about 60 cubic centimeters (cc) per revolution regardless of the pressure at port "C." The secondary rotor may displace about the same volume/revolution, providing the power steering unit with a total potential displacement of about 120 cc/revolution when the "C" port is pressurized. While described herein as using power steering units having particular volumetric flow rates, those of skill in the art will realize that such configurations are exemplary only and other embodiments may utilize power steering units that provide volumetric flow rates scaled for most any particular application.

To provide pressure to the "C" port of the power steering unit 306' (and thus place the power steering unit in its first configuration), the system 320 may include a solenoid valve 310 interposed between the pump 302 and the "C" port. In one embodiment, the solenoid valve is manufactured by Hydraforce, Inc. of Lincolnshire, Ill., USA, under part number SV08-30. The solenoid valve 310 may be controlled by a steering ratio input control 314. In one embodiment, the control 314 is a manual control apparatus (e.g., switch) selectively actuatable by the operator. In another embodiment, control 314 may be automatically responsive to a dynamic vehicle variable such as vehicle speed above a certain threshold (e.g., above about 6 miles/hour), steering angle, etc.

When the solenoid valve 310 is in a first or open position (e.g., energized), pressure may be applied to port "C" of the power steering unit 306', placing the power steering unit in the first configuration. When the power steering unit 306' is in the first configuration, the power steering unit may provide a greater output for a given input, e.g., increased hydraulic flow output to the cylinder 216 for a given steering input. Accordingly, the ratio of output of the cylinder 216 to input of the steering input device (shown in the figure as steering wheel 110) may be greater when the power steering unit 306' is in its first configuration (e.g., when the valve 310 is in the first position) than when the power steering unit is in its second configuration (e.g., when the valve 310 is in a second or closed position (e.g., de-energized) as is schematically illustrated in FIG. 6B).

In an exemplary embodiment, when the power steering unit 306' is in the first configuration, the steering wheel 110 may require about 1.5 to 2.5 turns (e.g., about 1.5 turns) to move from maximum left to maximum right. However, when the power steering unit 306' is in the second configuration ("C" port connected to tank), the steering wheel 110 may require about 3 to about 5 turns (e.g., about 3 turns) to move from maximum left to maximum right. These differing steering ratios may provide various benefits including, for example, less responsive steering at higher, e.g., transport, speeds.

With reference again to FIG. 2, operation of the exemplary 4WS system 200 will now be described. When the operator desires to change mower 100 direction, the steering wheel 110 may be rotated in either direction (e.g., clockwise or counterclockwise) in a conventional fashion. The power steering unit 306/306' (see FIGS. 6A-6B), which may be attached to the lower end of the steering wheel column as shown in FIG. 2, may then port fluid to one side of the other of the piston of the cylinder 216, causing the same to extend (or retract). As the cylinder extends (or retracts), it pushes (or pulls) the steering lever arm 210, causing it to pivot about frame pivot joint 214. As the arm 210 pivots, it moves the steering lever arm pivot joints 212 and front tie rods 208, which in turn pivot the front bell cranks 202. As the front bell cranks 202 pivot, the L-shaped support arms 120, and thus the wheels 108, pivot by corresponding angles.

Movement of the bell cranks 202 also results in movement of the rear tie rod pivot joints 224, and thus movement of the longitudinal tie rods 226 and the pivot joints 228. As the tie rods 226 move, the lever arms 204 and rear support arms 126 pivot about the rear frame pivots 128, resulting in pivoting of the rear wheels 106 in a direction opposite the direction of the front wheels. As a result, the mower 100 turns by changing the steering angle of each wheel.

In one embodiment, the 4WS system 200 is configured to produce a turning or steering center (i.e., the point or vertical axis about which the mower 100 may turn) that is positioned within a first zone 230 identified in FIG. 2. The first zone 230 may be defined by parallel transverse lines passing: through a blade spindle 117; and through a trailing edge of the cutting deck 114, and by longitudinal lines laterally spaced inwardly and outwardly from the outermost edge of the deck (e.g., from the trim edge 115) by a distance equal to ½ of the blade 116 radius. In one embodiment utilizing a 60 inch wide deck, this yields a first zone 230 that is about 10.3 inches wide and 10.7 inches deep.

In another embodiment, the steering center may lie within a second zone 232 similarly circumscribed in the transverse direction, but extending longitudinally from the blade spindle 117 forwardly to a forward, outer edge of the cutting deck 114.

As opposed to conventional front wheel steering vehicles (which limit turning to a point that is generally along an axis of the rear axle) or rear wheel steering vehicles (which similarly limited turning to a point that is generally along an axis of the front axle), AWS (e.g., 4WS) in accordance with embodiments of the present invention permits placement of the turning center at most any location. Selection of the actual turning center may be based upon several factors. For example, with a vehicle such as the mower 100 having a mid-mount cutting deck 114 as described herein, the turning center of the mower may be located at or slightly outboard (or inboard) of the trim edge 115 of the cutting deck (e.g., within the first zone 230). In other embodiments, the center of gravity (CG) of the operator may be located at the same longitudinal location as a transverse line intersecting the turning center of the mower (e.g., the steering center (see, e.g., steering center 123 in FIG. 2) may be located on a transversely extending line positioned at a longitudinal location along the mower such that the transversely extending line intersects the seat). However, in still other embodiments, the CG of the operator may be slightly longitudinally behind (e.g., up to about 9 inches behind) the turning center. Such a configuration may, for example, maintain intuitive deck (trim edge) movement based upon operator steering input; and place the trim edge 115 of the deck 114 in a location that is easily viewed by the operator. In one embodiment, the turning center is located, at all vehicle steering angles, substantially on a single line (see, e.g., line 119 in FIG. 2) that extends transversely and orthogonally from the longitudinal axis of the mower.

While described herein as falling in a particular zone or zones, one benefit of AWS vehicles in accordance with embodiments of the present invention is that the turning center may be located at most any location (limited only by the geometry of the vehicle and the turning mechanism). Accordingly, it is to be understood that vehicles having turn centers that lie outside of the zones described herein are certainly possible without departing from the scope of the invention.

As AWS (e.g., 4WS) vehicles are able to maintain at least one steerable wheel in contact with the ground surface at substantially all times (e.g., even in the event of drive wheel slippage or momentary wheel lift), such vehicles may offer increased variability with the longitudinal placement of the vehicle's CG. For example, 4WS mowers may be well-suited to applications wherein the CG may longitudinally shift during operation, e.g., bagging.

While illustrated as having front wheels 108 (front support arms) that turn, relative to the frame, in a first (e.g., clockwise) direction and rear wheels 106 (rear support arms) that turn in a second, opposite (e.g., counterclockwise) direction, the mechanism that controls steering could, in another embodiment, be configured to turn all wheels in the same direction (e.g., counterclockwise in FIG. 2) without departing from the scope of the invention. Moreover, while all wheels are illustrated as having a common turning center, other embodiments may vary the turning center of the front as compared to the rear wheels. For instance, the steering response of the rear wheels could be reduced or even disabled under some circumstances, e.g., high speed transport.

As described above, the steering system 200 may be configured to provide a relatively quick steering response. For example, the steering wheel 110 may require about 2.5 turns or less (e.g., about 2.2 turns) to move from maximum left (e.g., maximum left turn) to maximum right (e.g., maximum right turn). This ratio may be fixed or, as described above, actively varied by a steering ratio control mechanism.

Figure 7:
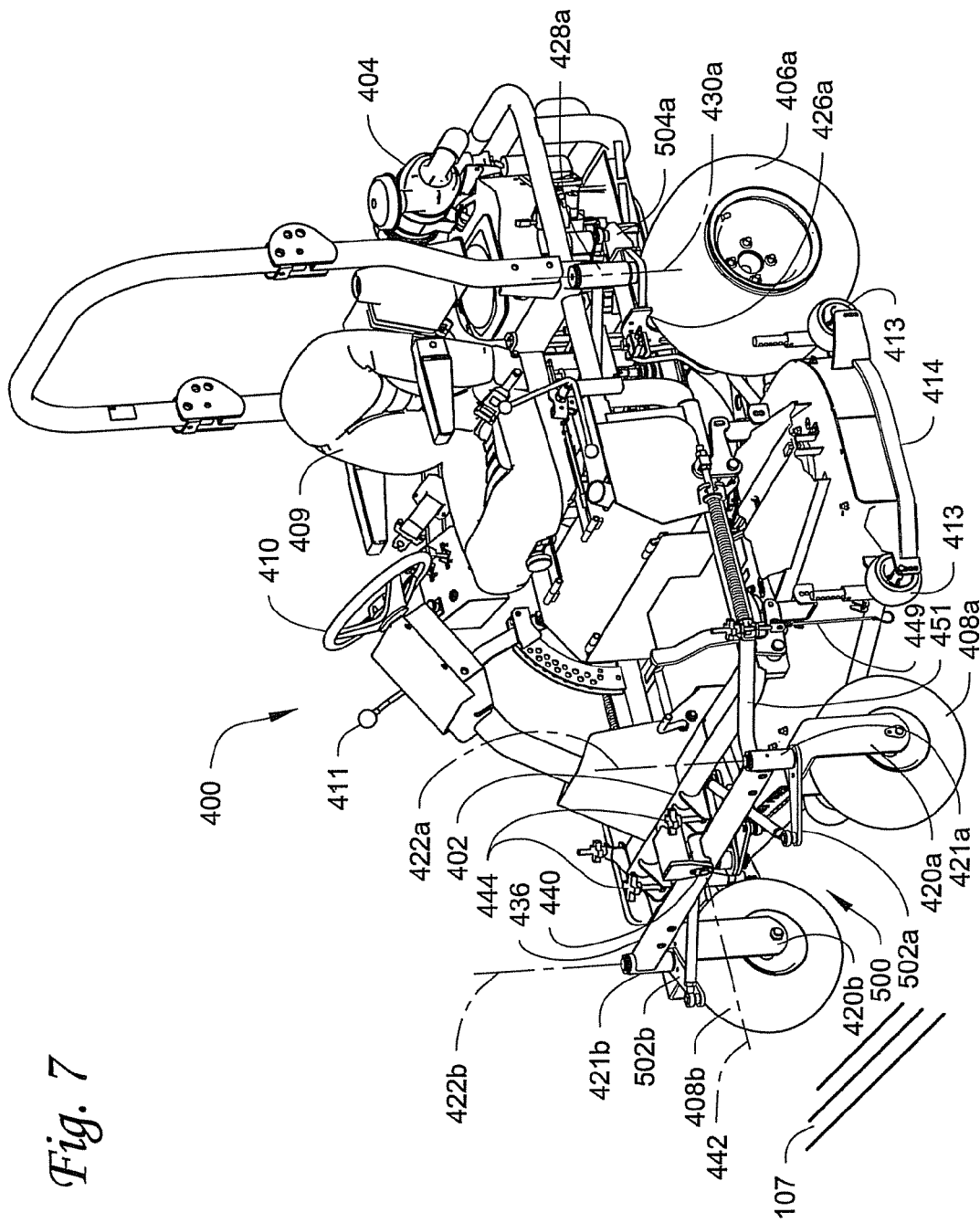
FIG. 7 is a perspective view of another exemplary vehicle, e.g., a riding lawn mower, incorporating an AWS system in accordance with another embodiment of the invention.

FIG. 7 illustrates an AWS system, e.g., 4WS system 500, in accordance with another embodiment of the present invention as it may be incorporated on a vehicle, e.g., a rear engine, rear drive riding lawn mower 400. Like the mower 100, the mower 400 may include an underlying chassis or frame 402 that supports a prime mover, e.g., internal combustion engine 404. A pair of transversely opposing, rear wheel assemblies including rear ground engaging drive wheels 406 (only left rear wheel 406a visible in FIG. 7) may support the mower 400 in rolling engagement with the ground surface 107. Further, at least one front wheel assembly including a front wheel 408 may support a forward portion of the mower 400 in rolling engagement with the ground surface. Once again, the mower 400 may include two front wheels 408 (e.g., wheels 408a and 408b), and two drive wheels 406 that are powered by separate hydraulic motors 434 (see FIG. 11), the latter attached directly to an axle of each drive wheel. Each of the hydraulic motors 434 may receive power from a hydraulic pump (e.g., hydrostatic pump 304 of FIG. 6A) under the control of the operator from an operator seat 409. The hydraulic pump, in turn, may be powered by the engine 404. Once again, this vehicle is exemplary only, and other embodiments may be configured to accommodate various operational goals/requirements (e.g., all wheel drive vehicles, configurations using a single hydraulic motor and/or multiple hydraulic pumps, etc.).

A cutting deck 414 may be mounted, in one embodiment, in a mid-mount configuration to the lower side of the frame 402. The cutting deck 414 may include one or more cutting blades (see, e.g., cutting blades 116 of FIG. 2) that are operatively powered by the engine 404. Miscellaneous controls 411 permit operator control of various mower functions, e.g., throttle, blade engagement, etc. As with the vehicle 100, a steering input device, e.g., steering wheel 410, may permit the operator to control the direction of the mower from the seat 409 as further described below. The cutting deck 414 may optionally include deck rollers 413 to assist in supporting the cutting deck relative to the ground surface 107 during operation.

Each of the front wheels 408 may be rotatably mounted to an axle that is itself attached to a support arm, e.g., an inverted U-shaped support arm 420. Each support arm 420 may be pivotally coupled to a front frame pivot 421 located on a front frame rail 436 for pivoting about generally vertical pivot axes 422. Each pivot axis 422 may be located through a centerline of its respective wheel 408.

As further described below, each support arm 420 may include a front bell crank 502 that may be integral to, or coupled with, the respective support arm. As a result, the bell cranks 502 may preferably move, e.g., pivot about the respective axes 422, in unison with their corresponding support arms 420 and wheels 408, e.g., rotation of the bell crank 502a results in corresponding rotation of the arm 420a and wheel 408a. The bell cranks 502 may couple to the support arms 420 in any number of ways as already described herein (see, e.g., description of bell cranks 202).

Figure 8:
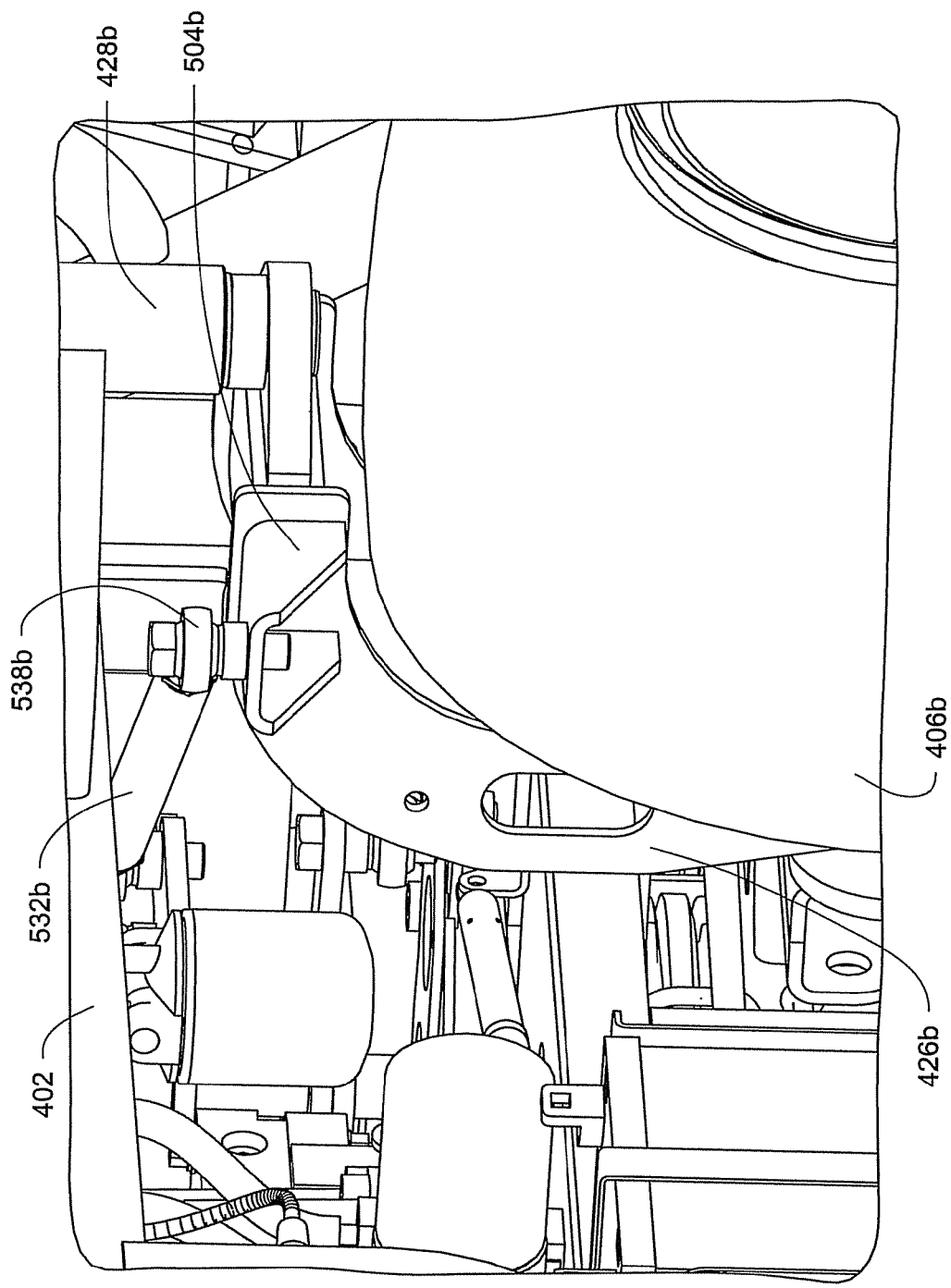
FIG. 8 is an enlarged perspective view of a right rear wheel portion of the mower of FIG. 7.

Each rear wheel 406 may be attached to an axle that is rotatably mounted to a support arm, e.g., an inverted L-shaped support arm 426 (see also FIG. 8). Each support arm 426 may be pivotally coupled to a rear portion (e.g., to a rear frame pivot 428) of the frame 402 for pivoting about generally vertical pivot axes 430. Each pivot axis 430 may, in one embodiment, be located through a centerline of its respective wheel 406. Each support arm 426 may include, or otherwise be attached to, a rear lever arm 504 for connection to the 4WS system as further described below.

Each of the rear wheels 406 may, like the wheels 106 of the mower 100, have attached thereto a hydraulic motor 434 (see FIG. 11) capable of rotating the axle and, accordingly, the attached rear drive wheel. In one embodiment, the two hydraulic motors may be hydraulically connected in parallel as already described herein.

FIG. 8 is a perspective view of a right rear wheel portion of the mower of FIG. 7 illustrating the AWS as it connects to a rear wheel 406b. The frame 402, rear tie rod 532b, pivot joint 538b, rear lever arm 504b, frame pivot 428b, and rear support arm 426b are also illustrated in this view.

Figure 9:
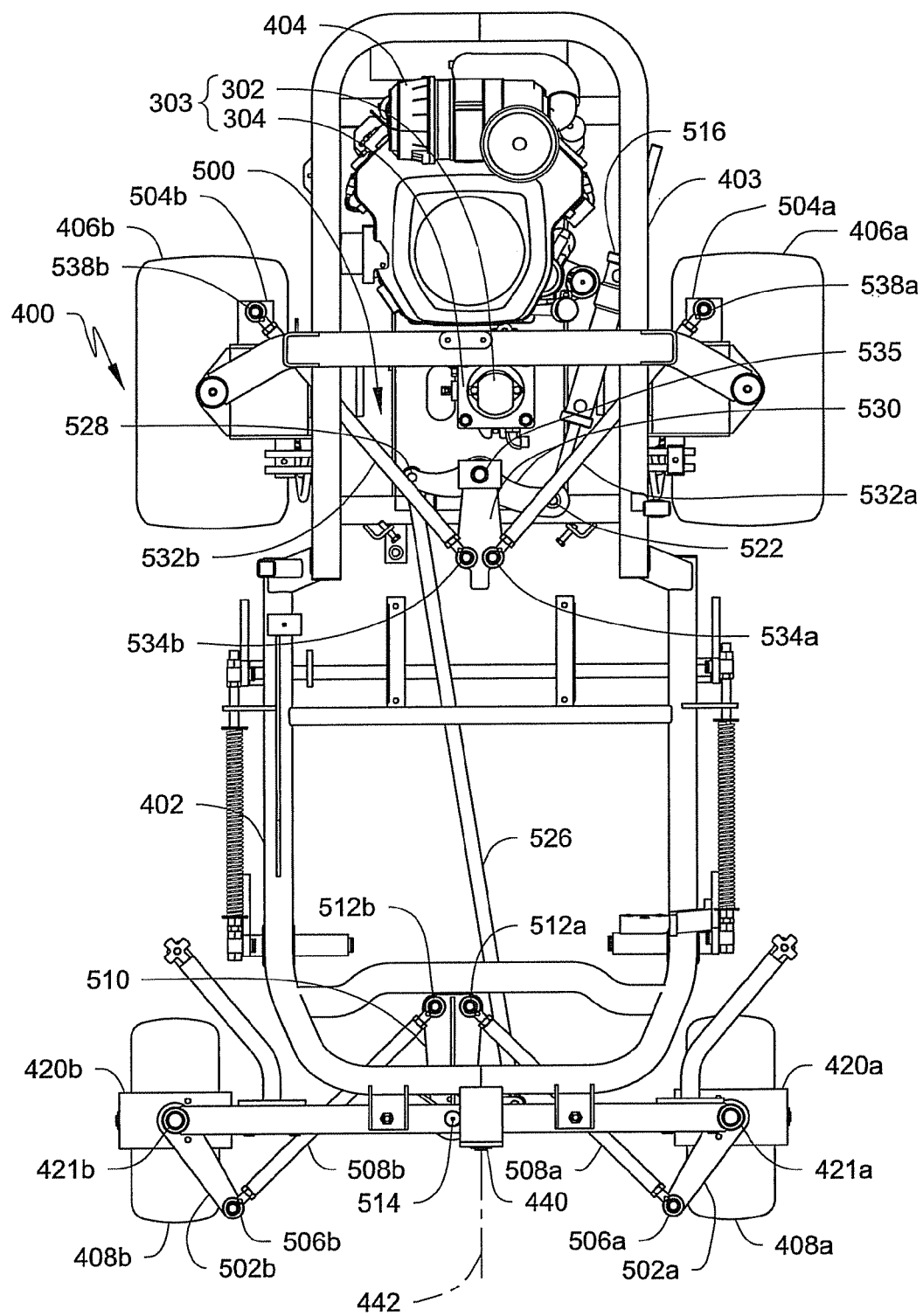
FIG. 9 is a top plan view of the mower of FIG. 7 with some mower structure removed to better illustrate the exemplary AWS system.
Figure 10:
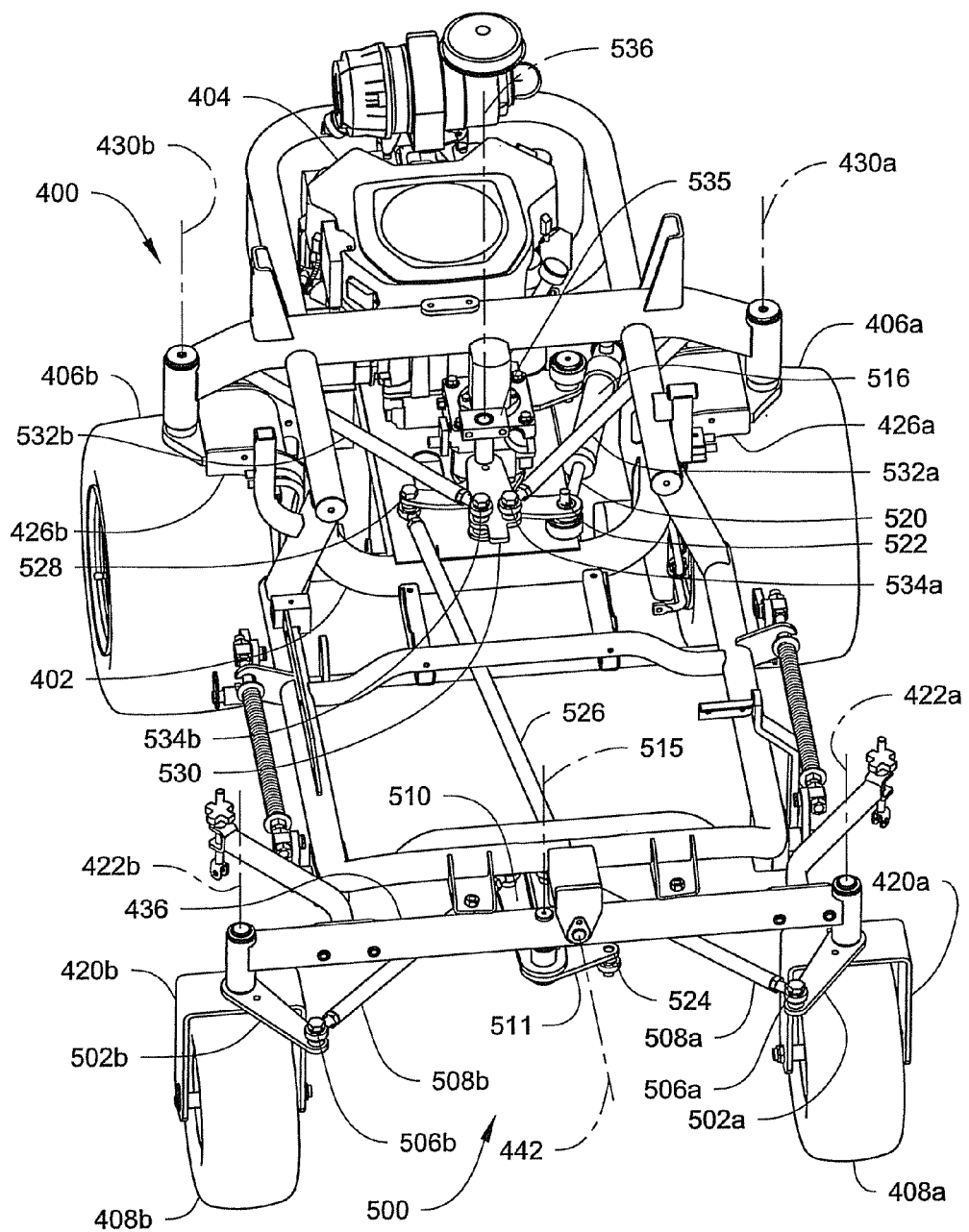
FIG. 10 is an upper front perspective view of the mower of FIG. 9 with some mower structure removed to better illustrate the AWS system.
Figure 11:
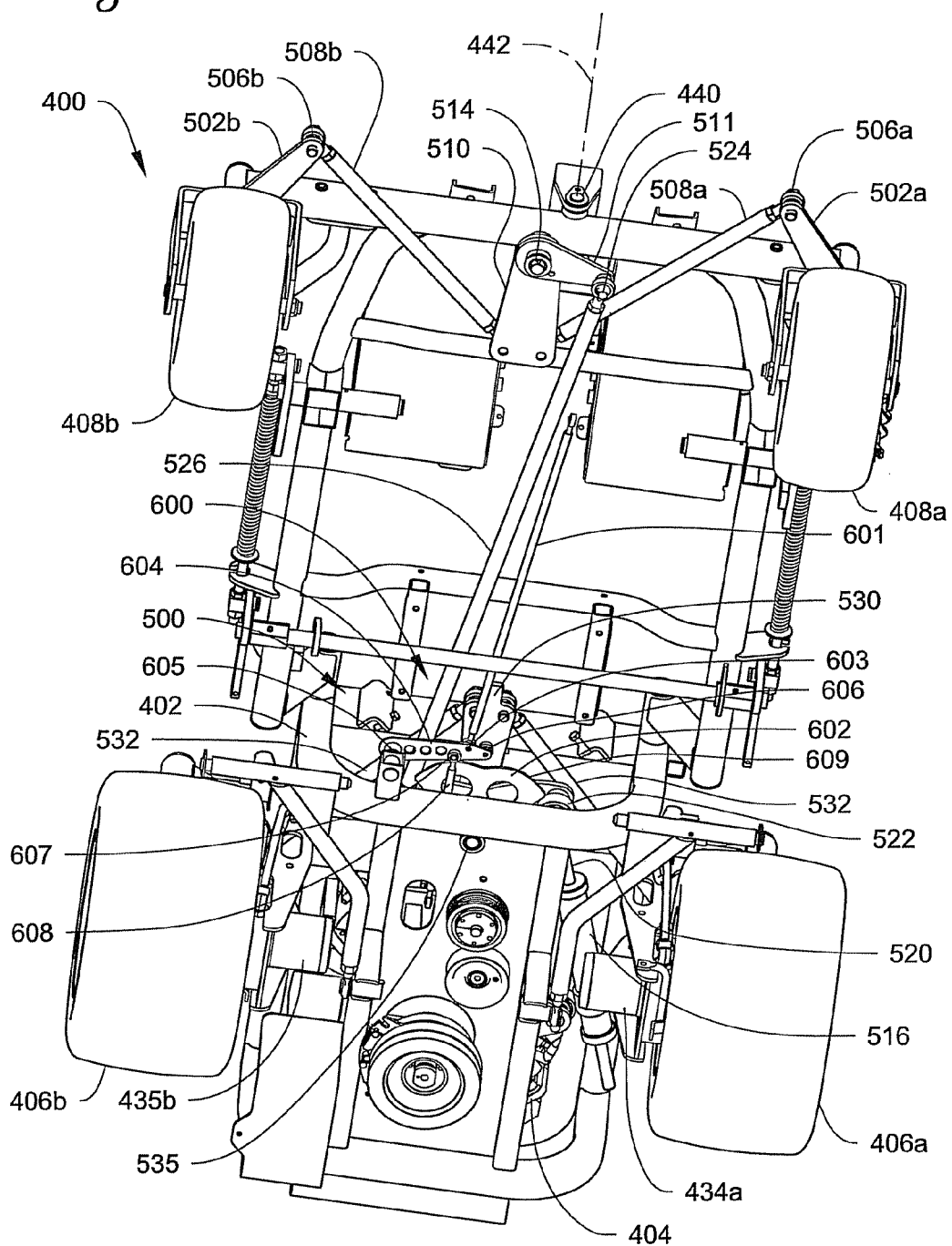
FIG. 11 is a bottom perspective view of the mower of FIG. 9 with some mower structure removed to better illustrate the AWS system and an exemplary speed limiting system.

The steering system 500 will now be described primarily with reference to FIGS. 9-11, wherein FIG. 9 is a top plan view of the chassis of the mower 400, FIG. 10 is an upper front perspective view thereof, and FIG. 11 is a bottom perspective view thereof. These figures are shown with various mower structures, subsystems, and/or components removed in order to better illustrate and describe various aspects of the mower 400 and steering system 500.

Each bell crank 502 (e.g., bell crank 502a and 502b) may include a front tie rod pivot joint 506 for pivotally coupling the respective bell crank to first ends of forward tie rods 508 (e.g., tie rods 508a and 508b). Second ends of tie rods 508 may pivotally couple to a steering lever arm 510 at steering lever arm pivot joints 512. The steering lever arm 510 may be pivotally coupled to the frame at frame pivot joint 514 (for pivoting about an axis 515 as shown in FIG. 10 when the mower is turned by an operator).

The steering lever arm 510 may further include, or be attached to, a crank arm 511 (see FIGS. 10 and 11). The crank arm 511 may include a rear tie rod pivot joint 524 for pivotally coupling the steering arm 510 to a first end of a longitudinal tie rod 526. A second end of the tie rod 526 may pivotally couple to a rear bell crank 530 at pivot joint 528.

The rear bell crank 530 may pivotally attach to first ends of rear tie rods 532 via pivot joints 534. The rear bell crank 530 may further pivotally attach to the frame 402 of the mower 400 via a journaled pivot joint 535 such that the rear bell crank may pivot about an axis, e.g., a generally vertical axis 536 as shown in FIG. 10 (once again, for purposes of illustration, some mower frame structure is removed in and around the pivot joint 535 in the figures). Second ends of the tie rods 532 may pivotally attach to respective rear lever arms 504 at pivot joints 538.

The rear bell crank 530, the rear tie rods 532, the front steering lever 510, forward tie rods 508, longitudinal tie rod 526, and associated components may be described collectively herein as a steering linkage assembly.

The 4WS system 500 may, like the system 200, include a steering actuator, e.g., a hydraulic steering cylinder 516 that is identical or substantially similar to the cylinder 216 described elsewhere herein. However, the cylinder 516 is mounted to the frame near the rear of the mower 400 as illustrated in the figures (see, e.g., FIG. 9). The cylinder 516 may include a lug on the cylinder body to permit pivotal attachment of the cylinder to the frame in the vicinity of reference numeral 403 (see FIG. 9) at a pivot joint (not shown). An end of a piston rod 520 of the cylinder 516 may pivotally attach to the rear bell crank 530 at pivot joint 522.

As with the mower 100 and system 200, many of the pivot joints described and illustrated herein (e.g., joints 506, 512, 522, 524, 528, 534, and 538) may utilize spherical rod end connections.

The steering system 500 may utilize a hydraulic circuit or system and accompanying components that are identical (or substantially similar) to those described and illustrated with respect to the mower 100 and 4WS system 200 (see, e.g., FIGS. 6A and 6B). That is, it may include a power steering unit 306, pump assembly 303 (e.g., gear pump 302 and hydrostatic pump 304), wheel motors 434, and other components as already discussed above. As these components are identical or similar to those already described, no further explanation is provided herein.

Figure 12:
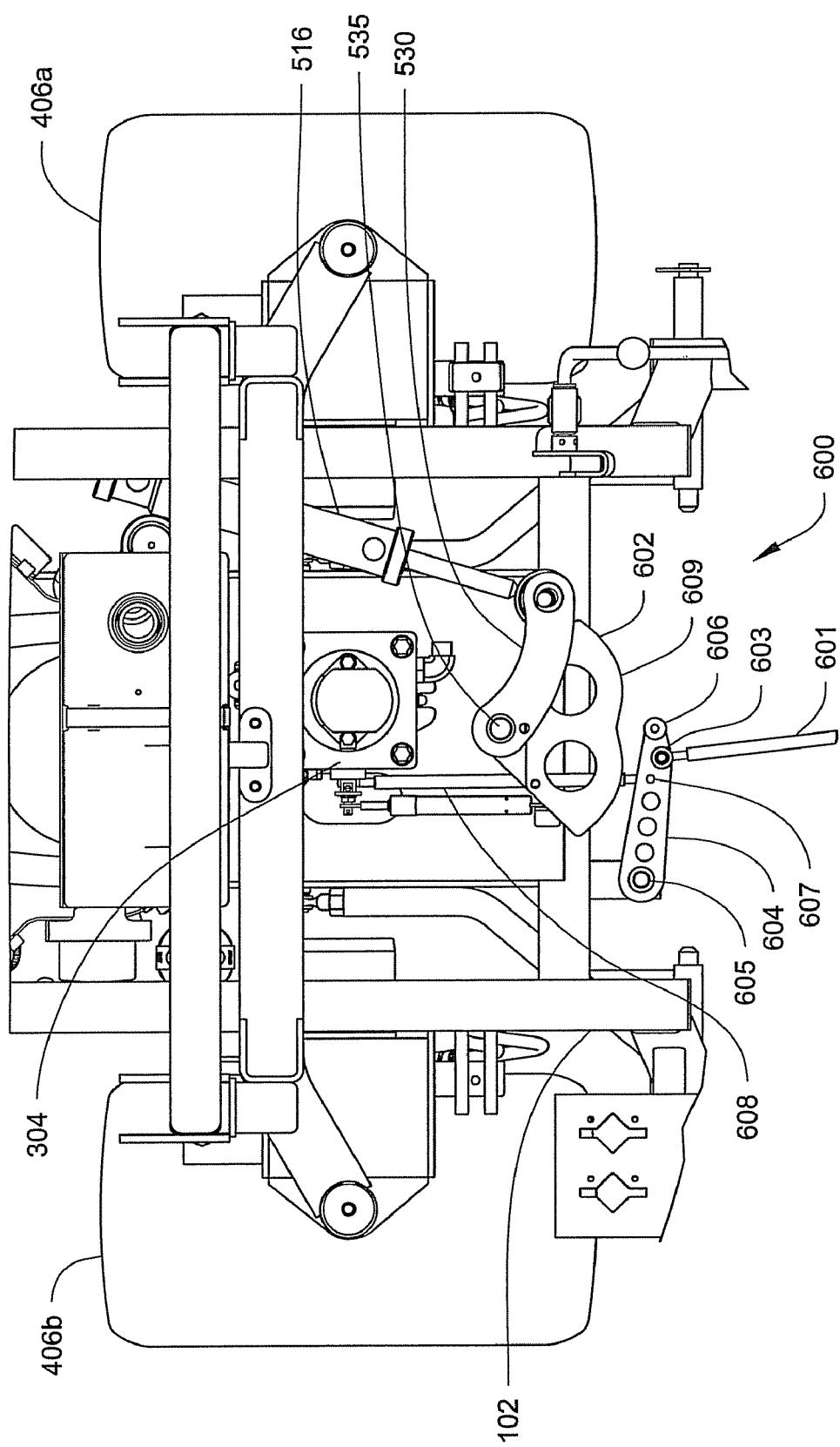
FIG. 12 is a top plan view of a portion of the mower of FIG. 11 with some steering structure removed to better illustrate the speed limiting system.

FIGS. 11 and 12 illustrate not only the steering system 500, but also an optional steering-based, speed-limiting system 600. As the name implies, the system 600 may limit the speed of the mower 400 based upon the particular steering angle. As shown in FIG. 11, the system 600 may includes a first tie rod 601 that in the illustrated embodiment, connects at a forward end to a speed input control member, e.g., foot pedal (not shown). Movement of the foot pedal may thus result in fore-and-aft movement of the tie rod 601. A rearward end of the tie rod 601 may pivotally connect to a lever 604 at a pivot joint 603. The lever 604 may, in turn, be pivotally coupled to the frame 402 at pivot joint 605.

A second tie rod 608 may include a first end that is also pivotally coupled to the lever 604 at a pivot joint 607 as shown in FIG. 11. A second end of the tie rod may then couple to the hydraulic pump 304 (see FIG. 12). As a result, movement of the speed input control member (e.g., foot pedal) may cause rearward movement of the tie rod 601, resulting in pivotal movement of the lever 604, which, in turn, pushes the second tie rod 608 rearwardly. Rearward movement of the tie rod 608 may cause the hydraulic pump 304 to increase output, thus speeding rotation of the rear drive wheels 406. As one can appreciate, the reverse process (releasing the foot pedal) would slow the rotational speed of the drive wheels 406.

The system 600 may further include a cam 602 associated with the steering linkage assembly and defining a cam surface 609. The cam 602 may be fixed relative to the rear bell crank 530 such that the cam may pivot in unison with the rear bell crank about the pivot 535.

A cam follower 606 is also provided. The cam follower, which may be a roller attached to a distal end of the lever 604 as shown, may engage the cam surface 609 during mower operation. Due to the shape of the cam surface 609, the cam 602 may limit the rearward movement of the cam follower 606 and thus the rearward movement of the lever 604 and the tie rods 601, 608 as further described below.

With reference now to FIGS. 7-12, operation of the 4WS system 500 will be described. When the operator desires to change mower 400 direction, the steering wheel 410 (see FIG. 7) may be rotated in a conventional fashion. The power steering unit 306 (see FIG. 6A), which may again be attached to the lower end of the steering wheel column in FIG. 7, may then port fluid to one side or the other of the piston of the cylinder 516, causing the same to extend (or retract).

As the cylinder 516 extends (or retracts), it pushes (or pulls) the rear bell crank 530, causing it to pivot about the pivot joint 535. As the rear bell crank 530 pivots, it imparts a force to each of the rear tire rods 532, which imparts a force to each of the rear lever arms 504, to reposition each of the rear wheels 406 to the desired steering angle. Moreover, pivotal motion of the rear bell crank 530 also imparts a force to the longitudinal tie rod 526, thereby causing the crank arm 511 and steering lever arm 510 to pivot about the pivot joint 514. As the steering lever arm 510 pivots, it may impart a force to each of the forward tie rods 508. Movement of the forward tie rods 508, in turn, causes each front bell crank 502 to pivot and rotate the corresponding support arms 420 and front wheels 408 about the axes 422. As a result, a steering input by the operator to the system 500 will cause all four wheels 406, 408, to pivot so that the mower 400 may execute a turn.

Once again, while illustrated as having rear wheels 406 that turn opposite the front wheels 408, the mechanism that controls steering could be configured to turn all wheels in the same direction without departing from the scope of the invention.

In one embodiment, the 4WS system 500 is configured to produce a steering center located within one of the zones 230 or 232 as already described herein (see, e.g., FIG. 2). However, embodiments wherein the turning center lies outside of these zones are possible without departing from the scope of the invention.

As the wheels 406 and 408 turn, the cam 602 pivots about the pivot joint 535 in unison with the rear bell crank 530. Due to the shape of the cam surface 609, the limiting surface of the cam 602 (i.e., the surface that will contact the cam follower 606) will move forward from its position when the steering angle is zero. When the cam follower 606 engages the cam surface 609, the cam 602 may effectively prevent further increases in speed by limiting further movement of the speed control member (e.g., pedal, tie rod 601, and second tie rod 608). Moreover, the system 600 (e.g., the cam 602) may also displace the rolling follower 606 forwardly when the mower is traveling above a certain speed and is then turned. As a result, the mower 400 may be automatically slowed as the vehicle enters a turn.

While not specifically shown herein, an embodiment of the speed limiting system could also be utilized with the 4WS system 200 described above without departing from the scope of the invention.

Figure 13:
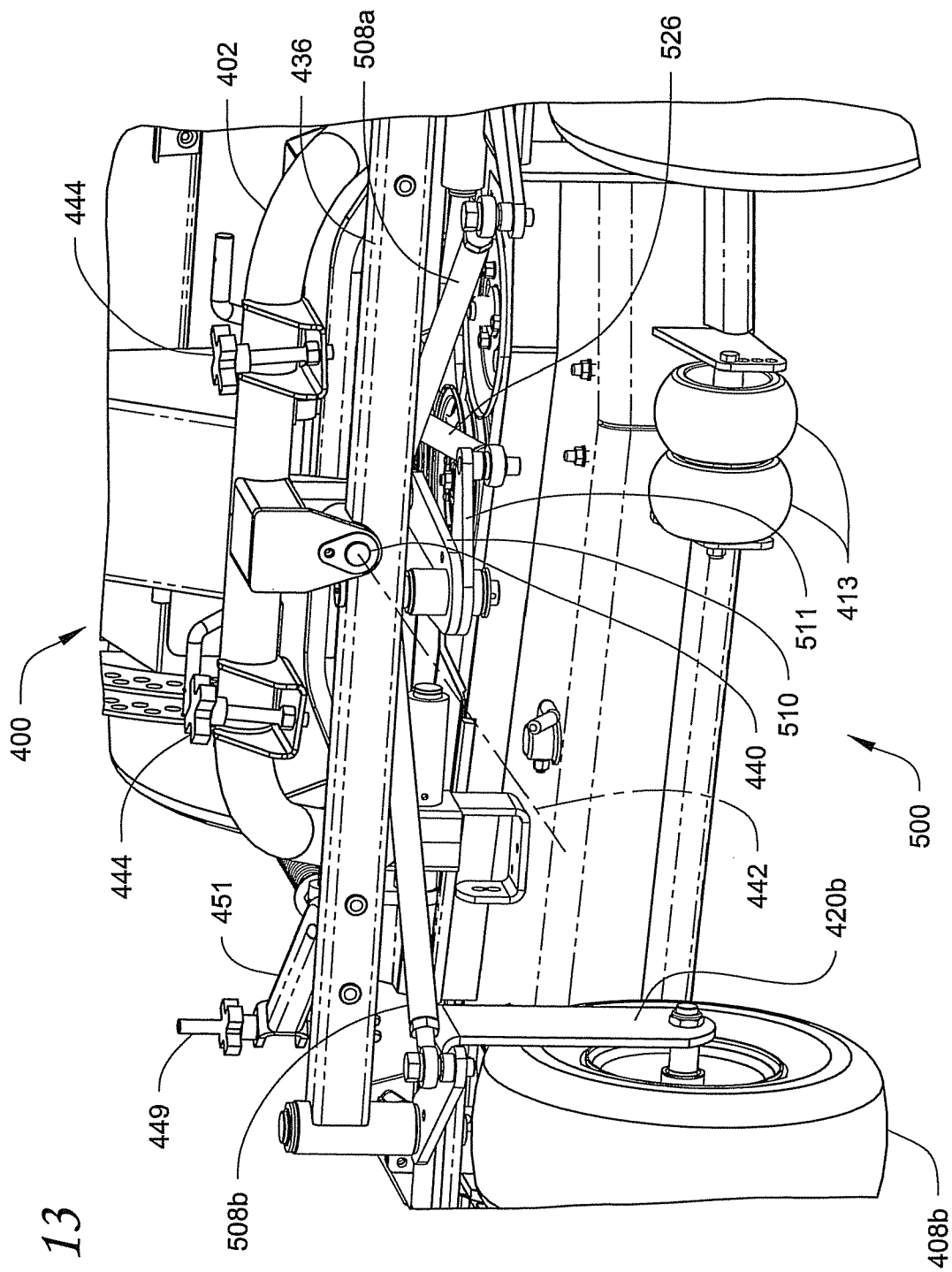
FIG. 13 is a perspective view of a front portion of the mower of FIG. 7.

FIG. 13 illustrates a perspective view of a front portion of the mower 400. In this view, the front frame rail 436, steering lever arm 510, and forward tie rods 508 are illustrated. As shown in this view, the front frame rail 436 may, like the frame rail 136 described above, pivotally attach to the frame 402 at a pivot joint 440 for pivoting about a horizontal pivot axis 442 that is generally parallel to a longitudinal axis of the mower 400. As with the mower 100, the mower 400 may incorporate stop members, e.g., adjustable stop members 444, to limit the pivotal motion of the frame rail 436 about the pivot 440.

Once again, the mower 400 may optionally include anti-scalping features in addition to the deck rollers 413. For example, the mower may include frame extensions 451 that extend rearwardly from the outer portions of the frame rail 436. The extensions 451 include support members 449 (see also FIG. 7) for operative attachment of the front frame rail 436 to the cutting deck 414 on each side of the mower. Thus, when the front frame rail 436 pivots upwardly on one side in response to, e.g., traversing a ground undulation, the cutting deck 414 may be lifted upwardly on the same side to reduce turf scalping.

As with the system 200 described above, the steering system 500 may be configured to provide a relatively quick steering response similar to that already described herein. In other embodiments, the actual steering response could be selected based upon the desired operational characteristics of the mower. For example, the steering system 500 could incorporate a steering ratio control system, e.g., system 320 of FIG. 6B, in which the steering response ratio may be varied, e.g., varied relative to mower speed, such that the steering wheel 410 requires more rotation (e.g., three turns lock-to-lock) at high speed, but less (e.g., about one to one and one half turns lock-to-lock) at lower speeds.

Illustrative embodiments of this invention are discussed and reference has been made to possible variations within the scope of this invention. These and other variations, combinations, and modifications of the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A mower vehicle comprising:
   a frame;
   a left front wheel assembly and a transversely offset right front wheel assembly both located at or near a forward end of the frame, wherein each of the left and right front wheel assemblies comprises: a front support arm pivotally coupled to the frame; and a steerable ground-engaging front wheel rotatably coupled to the front support arm;
   a left rear wheel assembly and a transversely offset right rear wheel assembly both located at or near a rearward end of the frame, wherein each of the left and right rear wheel assemblies comprises: a rear support arm pivotally coupled to the frame; and a steerable ground-engaging rear wheel rotatably coupled to the rear support arm;
   a cutting deck attached to the frame and located generally between the front wheel assemblies and the rear wheel assemblies;
   a steering linkage assembly comprising:
      a rear bell crank pivotally coupled to the frame;
      a left rear tie rod comprising a proximal end pivotally coupled to the rear bell crank, and a distal end pivotally coupled to the left rear wheel assembly, and a right rear tie rod also comprising a proximal end pivotally coupled to the rear bell crank, and a distal end pivotally coupled to the right rear wheel assembly;
      a front steering lever arm pivotally attached to the frame;
      a left front tie rod comprising a proximal end pivotally coupled to the front steering lever arm, and a distal end pivotally coupled to the left front wheel assembly, and a right front tie rod also comprising a proximal end pivotally coupled to the front steering lever arm, and a distal end pivotally coupled to the right front wheel assembly; and
      a longitudinal tie rod, wherein an aft end of the longitudinal tie rod is pivotally attached to the rear bell crank and a forward end of the longitudinal tie rod is pivotally attached to the front steering lever arm;
   a steering input device coupled to the frame to control vehicle direction; and
   a steering actuator attached to the frame and to the rear bell crank of the steering linkage assembly, the steering actuator responsive to manipulation of the steering input device.

2. The vehicle of claim 1, wherein the steering actuator comprises a linear hydraulic cylinder.

3. The vehicle of claim 1, wherein the steering input device comprises a steering wheel.

4. The vehicle of claim 1, wherein the rear support arm of each of the left and right rear wheel assemblies further comprises a lever arm, wherein the distal end of the right rear tie rod is pivotally attached to the lever arm of the rear support arm of the right rear wheel assembly, and wherein the distal end of the left rear tie rod is pivotally attached to the lever arm of the rear support arm of the left rear wheel assembly.

5. The vehicle of claim 1, wherein the front support arm of each of the left and right front wheel assemblies further comprises a front bell crank, wherein the distal end of the right front tie rod is pivotally attached to the front bell crank of the front support arm of the right front wheel assembly, and wherein the distal end of the left front tie rod is pivotally attached to the front bell crank of the front support arm of the left front wheel assembly.

6. The vehicle of claim 1, wherein the left and right front wheel assemblies and the left and right rear wheel assemblies are configured such that, when both the front support arms pivot relative to the frame in a clockwise direction, the rear support arms pivot relative to the frame in a counterclockwise direction.

7. The vehicle of claim 1, further comprising a hydraulic system, wherein the hydraulic system comprises: a power steering unit operatively coupled between the steering input device and the steering actuator; and a hydraulic pump coupled to the power steering unit.

8. The vehicle of claim 7, wherein the power steering unit is selectively configurable between at least a first and a second configuration such that, when in the first configuration, the power steering unit provides a ratio of output of the steering actuator to input of the steering input device that is greater than when the power steering unit is in the second configuration.

9. The vehicle of claim 7, wherein the hydraulic system further comprises:
   a left hydraulic motor to power the left rear wheel; and
   a right hydraulic motor to power the right rear wheel, wherein the left hydraulic motor and the right hydraulic motor are hydraulically coupled in parallel.

10. The vehicle of claim 1, further comprising:
    a speed control member; and
    a cam associated with the steering linkage assembly and positioned proximate the speed control member, wherein the cam is movable in response to a position of the steering actuator such that the cam limits movement of the speed control member.

11. The vehicle of claim 1, wherein the front and rear wheels are configured to turn the vehicle about a steering center that, at all steering angles, is located along a line that extends transversely to a longitudinal axis of the vehicle.

12. The vehicle of claim 11, wherein the steering center is, at least at one steering angle, located proximate a trim edge of the cutting deck.

13. A vehicle comprising:
    a frame;
    steerable left and right front wheel assemblies both located at or near a forward end of the frame, wherein the left and right front wheel assemblies each comprise: a front support arm pivotally coupled to the frame; and a rotatable ground-engaging front wheel coupled to the front support arm;
    steerable left and right rear wheel assemblies both located at or near a rearward end of the frame, wherein the left and right rear wheel assemblies each comprise: a rear support arm pivotally coupled to the frame; and a rotatable ground-engaging rear wheel coupled to the rear support arm;
    a rear bell crank pivotally coupled to the frame;
    left and right rear tie rods each comprising: a proximal end pivotally coupled to the rear bell crank; and a distal end, the distal ends of the left and right rear tie rods pivotally coupled to the left and right rear wheel assemblies, respectively;
    a front steering lever arm pivotally attached to the frame;
    left and right front tie rods each comprising: a proximal end pivotally coupled to the front steering lever arm; and a distal end, the distal ends of the left and right front tie rods pivotally coupled to the left and right front wheel assemblies, respectively;
    a longitudinal tie rod comprising an aft end pivotally attached to the rear bell crank, and a forward end pivotally attached to the front steering lever arm;
    a steering input device coupled to the frame and configured to control vehicle direction; and a steering actuator operatively attached to the rear bell crank and to the frame, the steering actuator responsive to manipulation of the steering input device.

14. The vehicle of claim 13, further comprising a hydraulic system, wherein the hydraulic system comprises: a power steering unit operatively coupled between the steering input device and the steering actuator; and a hydraulic pump coupled to the power steering unit.

15. The vehicle of claim 14, wherein the power steering unit is selectively configurable between at least a first and a second configuration such that, when in the first configuration, the power steering unit provides a ratio of output of the steering actuator to input of the steering input device that is greater than when the power steering unit is in the second configuration.

16. The vehicle of claim 14, wherein the hydraulic system further comprises:
 a left hydraulic motor configured to power the rear wheel associated with the left rear wheel assembly; and
 a right hydraulic motor configured to power the rear wheel associated with the right rear wheel assembly, wherein the left hydraulic motor and the right hydraulic motor are hydraulically coupled in parallel.

17. The vehicle of claim 13, further comprising:
 a speed control member selectively movable relative to the frame between a first position corresponding to a first speed of the vehicle, and a second position corresponding to a second speed of the vehicle, the second speed greater than the first speed; and
 a cam associated with the rear bell crank, the cam configured to contact the speed control member to limit movement of the speed control member between the first and second positions, wherein the cam is movable in response to movement of the steering input device.

18. The vehicle of claim 17, wherein the cam comprises a cam surface configured to move the speed control member towards the first position when the steering input device is moved from a first position corresponding to a first steering angle toward a second position corresponding to a second steering angle that is greater than the first steering angle.

19. The vehicle of claim 13, further comprising a cutting deck attached to the frame at a longitudinal location between the front wheel assemblies and the rear wheels assemblies, wherein a steering center of the vehicle is located proximate a trim edge of the cutting deck.

20. A vehicle comprising:
a frame;
steerable left and right front wheel assemblies both located at or near a forward end of the frame, wherein the left and right front wheel assemblies each comprise: a front support arm pivotally coupled to the frame; and a rotatable ground-engaging front wheel coupled to the front support arm;
steerable left and right rear wheel assemblies both located at or near a rearward end of the frame, wherein the left and right rear wheel assemblies each comprise: a rear support arm pivotally coupled to the frame; and a rotatable ground-engaging rear wheel coupled to the rear support arm; and
a steering linkage assembly comprising:
 a rear bell crank pivotally coupled to the frame;
 left and right rear tie rods each comprising: a proximal end pivotally coupled to the rear bell crank; and a distal end, the distal ends of the left and right rear tie rods pivotally coupled to the left and right rear wheel assemblies, respectively;
 a front steering lever arm pivotally attached to the frame;
 left and right front tie rods each comprising: a proximal end pivotally coupled to the front steering lever arm; and a distal end, the distal ends of the left and right front tie rods pivotally coupled to the left and right front wheel assemblies, respectively; and
 a longitudinal tie rod comprising an aft end pivotally attached to the rear bell crank, and a forward end pivotally attached to the front steering lever arm;
a steering input device coupled to the frame and configured to control vehicle direction;
a steering actuator operatively attached to the steering linkage assembly and to the frame, the steering actuator responsive to manipulation of the steering input device;
a speed control member selectively movable relative to the frame between a first position corresponding to a first speed of the vehicle, and a second position corresponding to a second speed of the vehicle, the second speed greater than the first speed; and
a cam associated with the rear bell crank, the cam configured to contact the speed control member to limit movement of the speed control member between the first and second positions, wherein the cam is movable in response to movement of the steering input device.

* * * * *